United States Patent
Tseng et al.

(10) Patent No.: US 11,048,332 B2
(45) Date of Patent: Jun. 29, 2021

(54) PICTURE SELECTION METHOD OF PROJECTION TOUCH

(71) Applicant: Compal Electronics, Inc., Taipei (TW)

(72) Inventors: Yu-Hao Tseng, Taipei (TW); Kun-Hsuan Chang, Taipei (TW); Wei-Jun Wang, Taipei (TW); Ting-Wei Wu, Taipei (TW); Hsin-Chieh Cheng, Taipei (TW); Jui-Tsen Huang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 122 days.

(21) Appl. No.: 15/595,961

(22) Filed: May 16, 2017

(65) Prior Publication Data

US 2017/0344230 A1 Nov. 30, 2017

Related U.S. Application Data

(60) Provisional application No. 62/370,682, filed on Aug. 3, 2016, provisional application No. 62/361,477, filed
(Continued)

(51) Int. Cl.
*G06F 3/01* (2006.01)
*G06F 3/0484* (2013.01)
(Continued)

(52) U.S. Cl.
CPC .......... *G06F 3/017* (2013.01); *G03B 21/142* (2013.01); *G03B 21/2046* (2013.01);
(Continued)

(58) Field of Classification Search
None
See application file for complete search history.

(56) References Cited

U.S. PATENT DOCUMENTS

| 2014/0168210 A1* | 6/2014 | Bromer | G02B 27/0093 345/419 |
| 2014/0172831 A1* | 6/2014 | Jin | G06F 3/04883 707/722 |

(Continued)

FOREIGN PATENT DOCUMENTS

| CN | 101895783 | 11/2010 |
| TW | I242162 | 10/2005 |
| TW | I521358 | 2/2016 |

*Primary Examiner* — Andre L Matthews

(57) ABSTRACT

A picture selection method of projection touch for a projection touch system is provided. The projection touch system includes an image projection module, a sensing module, an image recognition module including at least one camera module and a processing unit. The picture selection method includes: the sensing module sensing and transferring a first projection coordinate on the target picture at a first time point of a sensing action; the sensing module sensing and transferring a second projection coordinate on the target picture at a second time point of the sensing action; the processing unit selecting at least one to-be-selected picture in the target picture based on the first and second projection coordinates and generating a set of selected image data; and the processing unit controlling the selected image data projected by the image projection module to move to a designated position according to a movement instruction of the user.

22 Claims, 27 Drawing Sheets

Related U.S. Application Data on Jul. 12, 2016, provisional application No. 62/361,470, filed on Jul. 12, 2016, provisional application No. 62/341,053, filed on May 24, 2016.

(51) Int. Cl.

| | |
|---|---|
| *G06F 3/0481* | (2013.01) |
| *H04N 9/31* | (2006.01) |
| *G06K 9/62* | (2006.01) |
| *G06K 9/20* | (2006.01) |
| *H04N 5/232* | (2006.01) |
| *H04N 5/262* | (2006.01) |
| *G06F 3/0486* | (2013.01) |
| *G06F 3/0488* | (2013.01) |
| *G06F 3/16* | (2006.01) |
| *G06T 11/60* | (2006.01) |
| *G06K 9/00* | (2006.01) |
| *H04N 5/225* | (2006.01) |
| *H04N 5/235* | (2006.01) |
| *G03B 21/14* | (2006.01) |
| *G03B 21/20* | (2006.01) |
| *G06F 3/042* | (2006.01) |
| *H04N 5/247* | (2006.01) |
| *H04N 5/33* | (2006.01) |
| *H04N 9/07* | (2006.01) |
| *G06F 16/58* | (2019.01) |
| *G06F 3/043* | (2006.01) |
| *G06F 3/045* | (2006.01) |
| *G06K 7/14* | (2006.01) |

(52) U.S. Cl.
CPC ....... *G03B 21/2053* (2013.01); *G06F 3/0425* (2013.01); *G06F 3/0484* (2013.01); *G06F 3/0486* (2013.01); *G06F 3/04817* (2013.01); *G06F 3/04842* (2013.01); *G06F 3/04883* (2013.01); *G06F 3/167* (2013.01); *G06K 9/00* (2013.01); *G06K 9/00355* (2013.01); *G06K 9/2081* (2013.01); *G06K 9/6215* (2013.01); *G06T 11/60* (2013.01); *H04N 5/2256* (2013.01); *H04N 5/2258* (2013.01); *H04N 5/2351* (2013.01); *H04N 5/2352* (2013.01); *H04N 5/2354* (2013.01); *H04N 5/23216* (2013.01); *H04N 5/23296* (2013.01); *H04N 5/247* (2013.01); *H04N 5/2628* (2013.01); *H04N 5/33* (2013.01); *H04N 9/07* (2013.01); *H04N 9/315* (2013.01); *H04N 9/3155* (2013.01); *H04N 9/3179* (2013.01); *H04N 9/3194* (2013.01); *G06F 3/043* (2013.01); *G06F 3/045* (2013.01); *G06F 3/0421* (2013.01); *G06F 16/58* (2019.01); *G06K 7/1417* (2013.01)

(56) References Cited

U.S. PATENT DOCUMENTS

2016/0140375 A1* 5/2016 Luo ................ G06K 7/1443 235/462.09
2016/0330379 A1* 11/2016 Lee ................ G06F 3/0482
2017/0300174 A1* 10/2017 Alimian .......... G06F 3/0418

* cited by examiner

JAZZ FOR ROMANTIC
Nina-The Essential Nina Simone

| SPOTLIGHT ON THE ALBUM
She honors the songs by singing them the way they were written, reminding us why we fell in love with this music in the first place.

Y1'

JAZZ FOR ROMANTIC
Nina-The Essential Nina Simone i

SPOTLIGHT ON THE ALBUM
She honors the songs by singing them the way they were written, reminding us why we fell in love with this music in the first place.

JAZZ FOR ROMANTIC
Nina-The Essential Nina Simone

SPOTLIGHT ON THE ALBUM

She honors the songs by singing them the way they were written, reminding us why we fell in love with this music in the first place.

100

101

JAZZ FOR ROMANTIC
Nina-The Essential Nina Simone

SPOTLIGHT ON THE ALBUM
She honors the songs by singing them the way they were written, reminding us why we fell in love with this music in the first place.

PICTURE SELECTION METHOD OF PROJECTION TOUCH

FIELD OF THE INVENTION

The present invention relates to the technical field of projection touch, and more particularly to a picture selection method of projection touch.

BACKGROUND OF THE INVENTION

With the development of the projector-related industries, not only screen can be projected through a projector, but also the user's action can be sensed through a sensing device to generate a set of operational instructions. Then, an operation corresponding to the operational instructions is performed, and the result of the user's operation is projected onto a projection screen.

However, the conventional projection sensing device can only generate corresponding coordinate instructions based on the user's position in the projection screen and then generate corresponding operations according to the change of the coordinate instruction. Since the conventional projection sensing device can only generate the corresponding instruction according to the change of the coordinate, only the simple operation can be performed. In addition, the conventional projection sensing device cannot interact with the external picture, that is, the user can only operate the picture in the projection screen. In addition, the conventional projection sensing device cannot select the picture in the image, and cannot further retrieve and analyze the selected picture.

SUMMARY OF THE INVENTION

An objective of the present invention is to provide a picture selection method of projection touch for the user to select a picture.

Another objective of the present invention is to provide a picture selection method of projection touch capable of interacting with external pictures.

Still objective of the present invention is to provide a picture selection method of projection touch that can further retrieve and analyze the selected pictures.

The present invention provides a picture selection method of projection touch for a user to select at least one to-be-selected picture in a target picture through a projection touch system. The projection touch system includes an image projection module, a sensing module, an image recognition module including at least one camera module and a processing unit. The image projection module, the sensing module, the image recognition module and the processing unit are signally connected with each other. The image projection module is for projecting an image data screen of the projection touch system. The picture selection method includes steps of: a) the sensing module sensing and transferring a first projection coordinate on the target picture triggered by the user at a first time point of a sensing action; b) the sensing module sensing and transferring a second projection coordinate on the target picture triggered by the user at a second time point of the sensing action; c) the processing unit selecting the at least one to-be-selected picture in the target picture based on a coverage range of the first projection coordinate and the second projection coordinate and generating a set of selected image data; and d) the processing unit controlling the selected image data projected by the image projection module to move to a corresponding position designated by the user according to a movement instruction of the user.

The present invention further provides a picture selection method of projection touch for a user to select at least one to-be-selected picture in a target picture through a projection touch system. The projection touch system includes an image projection module, a sensing module, an image recognition module including at least one camera module and a processing unit. The image projection module, the sensing module, the image recognition module and the processing unit are signally connected with each other. The image projection module is for projecting an image data screen of the projection touch system. The picture selection method includes steps of: a) the sensing module sensing and transferring the at least one to-be-selected picture in the target picture triggered by the user for at least one time; b) the processing unit performing a selection of a content of the target picture based on a position selected by a first projection coordinate and generating selected image data; and c) the processing unit controlling the selected image data projected by the image projection module to move to a corresponding position designated by the user according to a movement instruction of the user.

The present invention provides a picture selection method of projection touch, in which different coordinate positions are triggered by the user at different time points, the picture data is selected according to the coordinate positions, and the operation process may be simultaneously displayed on the projected image screen projected by the image projection module. Further, when the user selects the picture data, the selected picture data can be further analyzed or retrieved to obtain information related to the selected picture, such as related picture or the corresponding translation of the text content, and the obtained information is displayed through a projection screen simultaneously, thereby achieving the above purpose.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
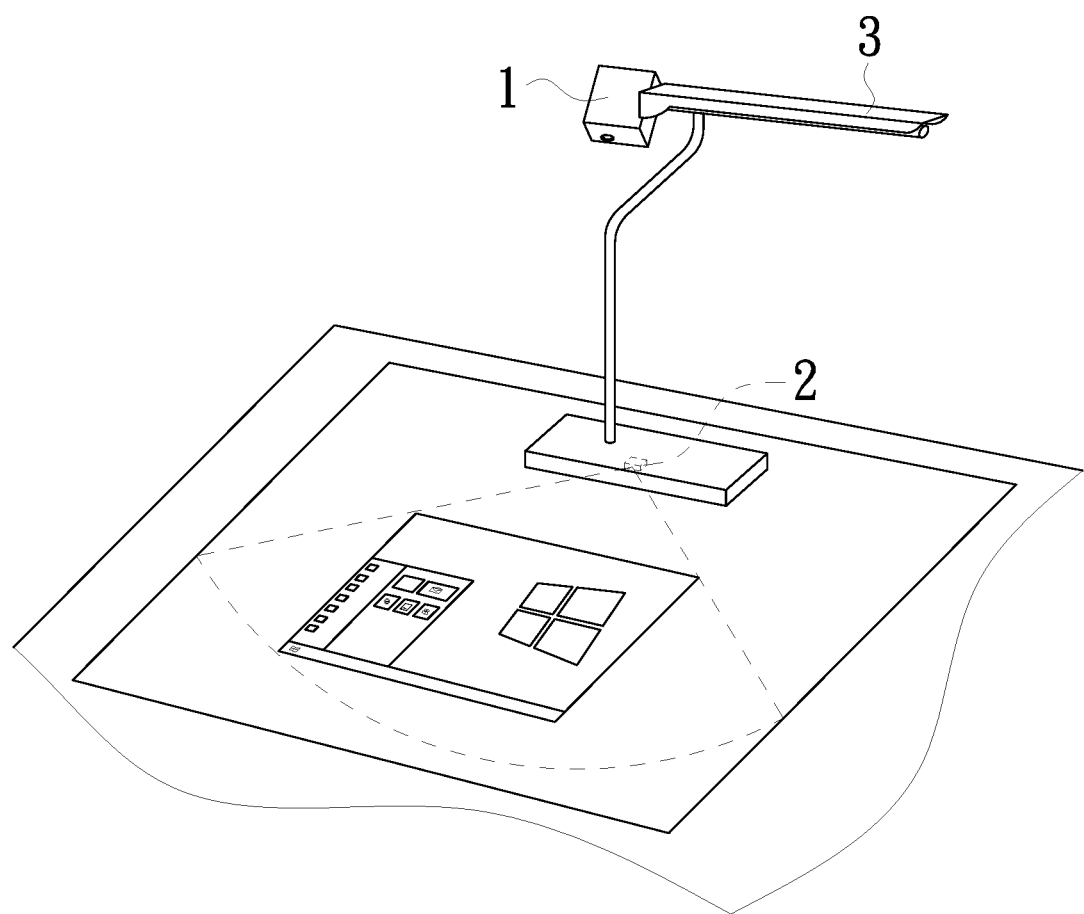
FIG. 1 is a schematic diagram of a projection touch system corresponding to a picture selection method in accordance with an embodiment of the present invention.
Figure 2:
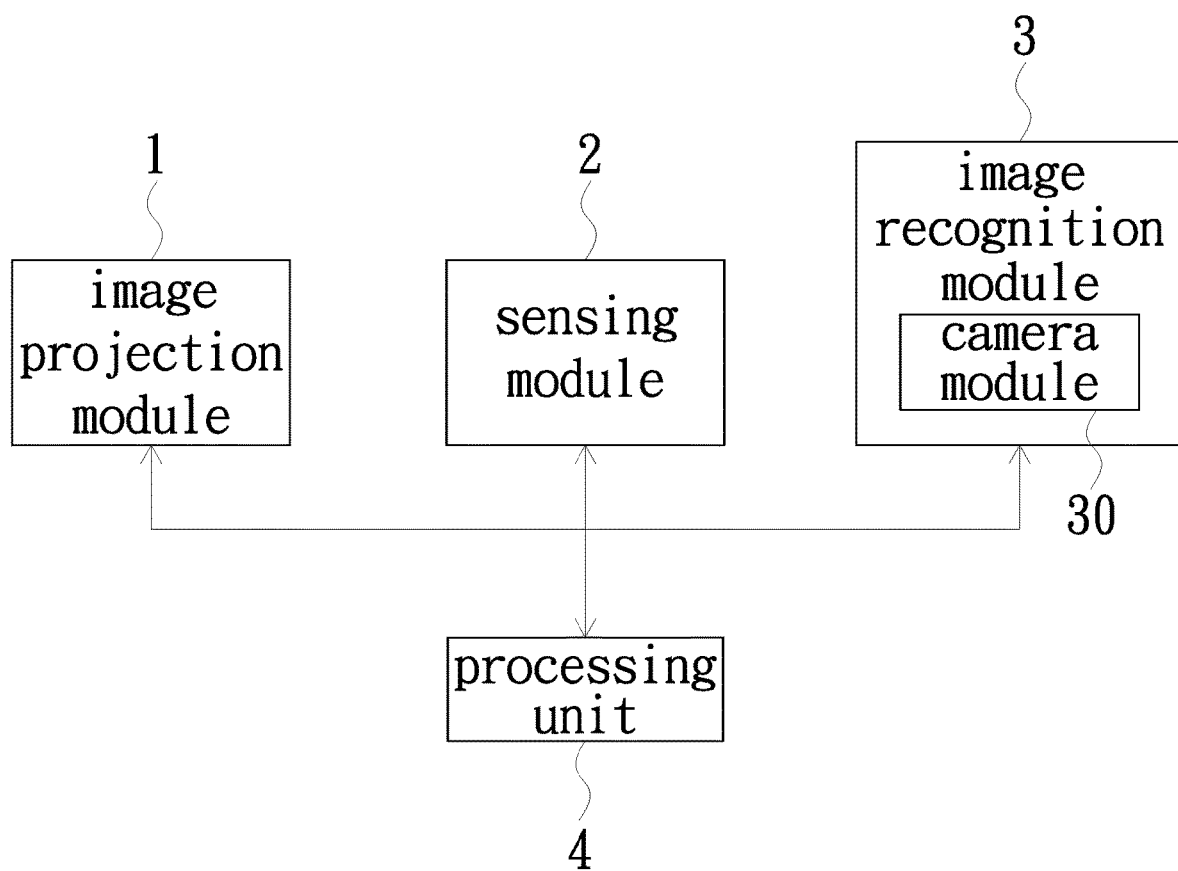
FIG. 2 is a block diagram of the projection touch system of FIG. 1.

The present invention provides a picture selection method for the user to select at least one to-be-selected picture in a target picture on a projection bearing plane through a projection touch system. The selection may be a single selection or multiple selections for different contents. The target picture may be a picture of a physical plane, such as an external picture, a cover of a book, an inner page of a book, a textual content, or a pattern or textual content in a display image of a virtual projection, or a surface picture of a three-dimensional object such as a specified surface picture or a textual content of a toy, a tool or food, or a surface picture of a whole three-dimensional object. FIG. 1 is a schematic diagram of a projection touch system corresponding to a picture selection method in accordance with an embodiment of the present invention. FIG. 2 is a block diagram of the projection touch system of FIG. 1. Please refer to FIGS. 1 and 2. The projection touch system includes an image projection module 1 (e.g., a projector) having a second sensing resolution, a sensing module 2 (e.g., an IR camera) having a first sensing resolution, a bearing plane of the projection touch system, an image recognition module 3 (e.g., a camera) including at least one camera module 30, and a processing unit 4. The image projection module 1, the sensing module 2, the image recognition module 3 and the processing unit 4 are signally connected to each other.

Figure 3:
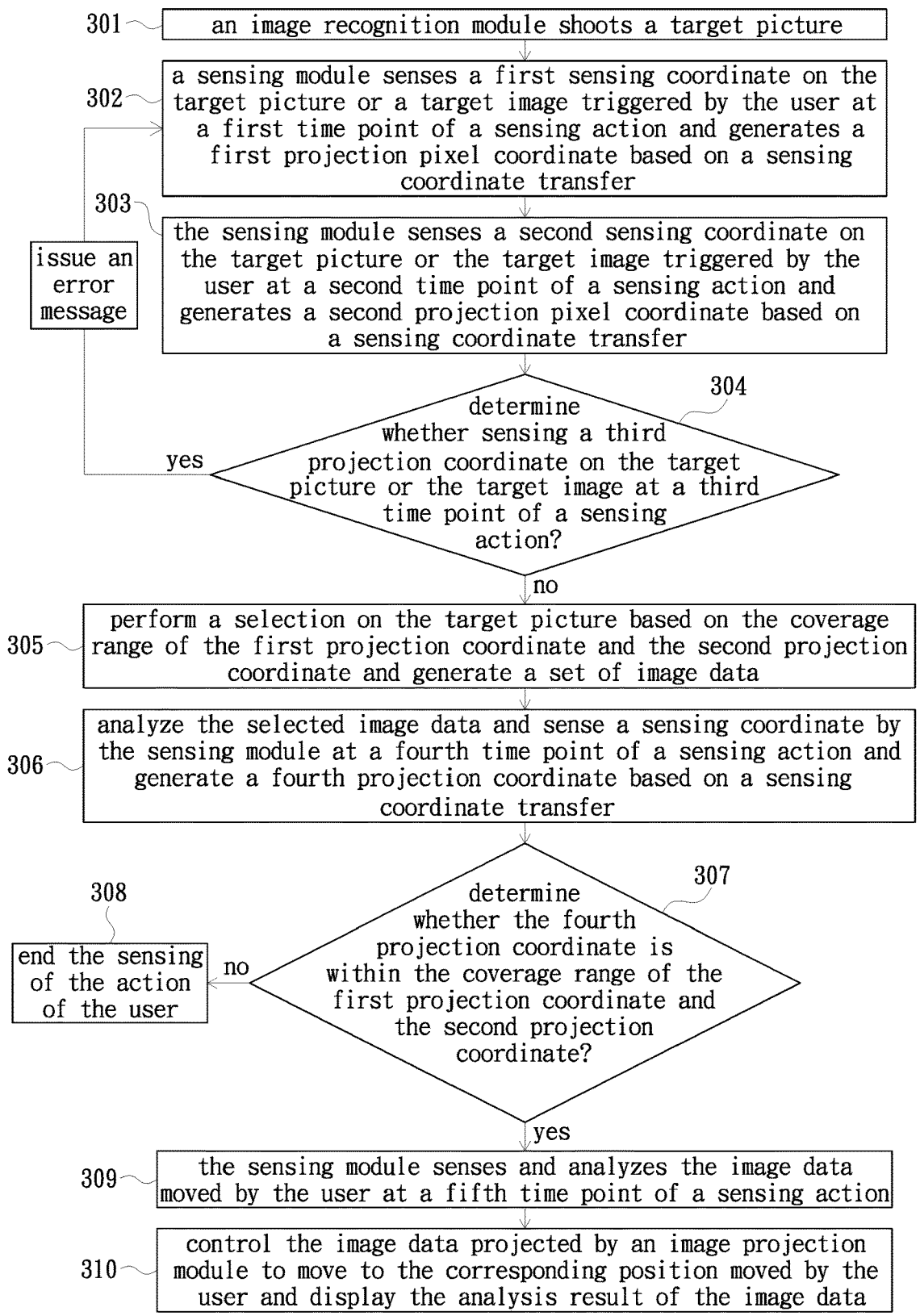
FIGS. 3, 3A, 3B, 3C, 3D and 3E are flow charts of a picture selection method of projection touch of FIG. 1.
Figure 4:
FIG. 4 is a schematic diagram of an operation of the picture selection method of projection touch of FIG. 3 for illustrating that the user triggers the first projection coordinate.
Figure 5:
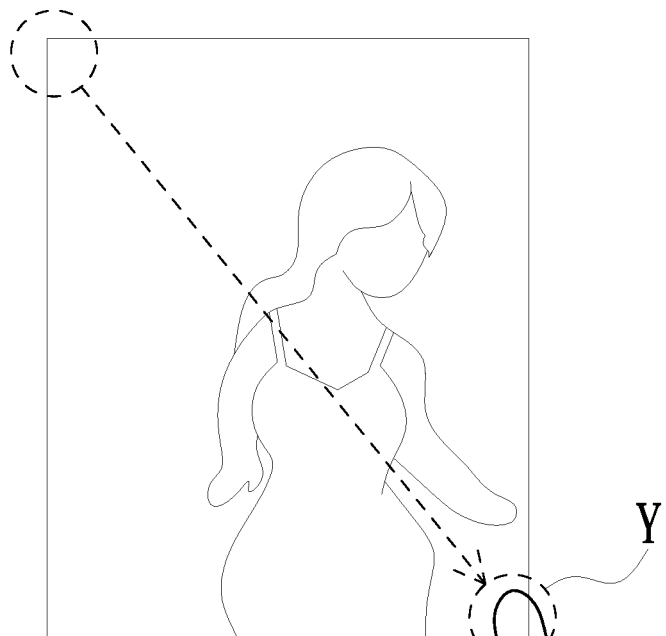
FIG. 5 is a schematic diagram of an operation of the picture selection method of projection touch of FIG. 3 for illustrating that the user triggers the second projection coordinate.
Figure 5A:
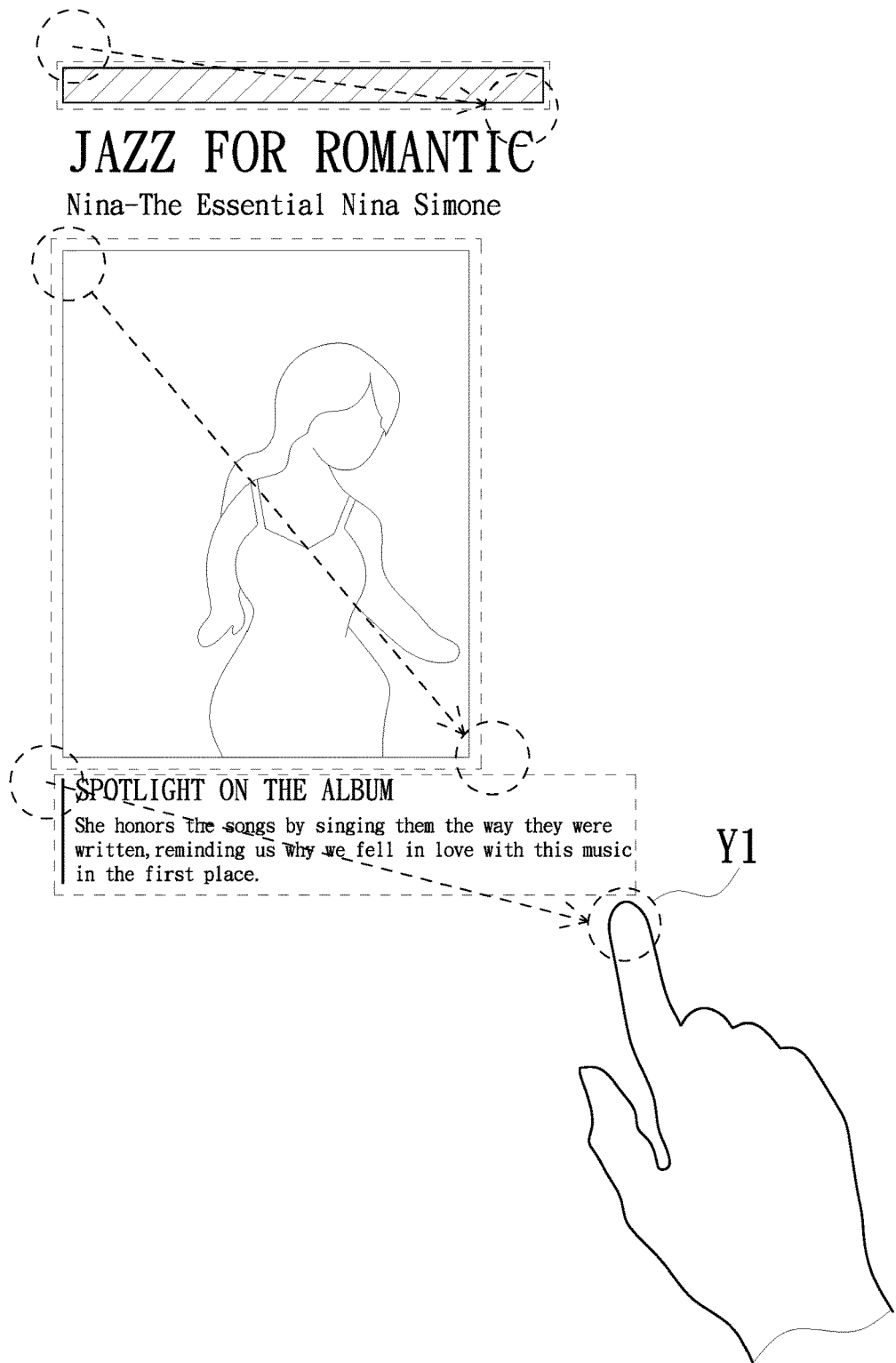
FIG. 5A is a schematic diagram of an operation of the picture selection method of projection touch of FIG. 3A.

FIG. 3 is a flowchart of a picture selection method in accordance with an embodiment of the present invention. Specifically, the picture selection method of the present embodiment is applicable to the projection touch system of FIG. 2 and uses frame selection technique to select the to-be-selected picture or its associated tag or textual content in the target picture, wherein the selection of the to-be-selected picture may be obtained by selecting its associated tag. First, step 301: the image recognition module 3 shoots the target picture to generate a corresponding target image and its background image data. Then, the processing unit 4 may cut off the background image data outside the target image to form target image data. The target image data can be projected onto the bearing plane of the projection touch system or a plane in other direction, such as the wall. If being projected onto the bearing plane, the target image data can overlap with the original target picture, or the target image data may be projected along by removing the original target picture data. Thereafter, step 302 (please also refer to FIG. 4): the sensing module 2 senses a sensing coordinate of a pixel in the first sensing resolution triggered by the user (for example, a pixel in a resolution 480×240 of an IR camera) at a first time point of a sensing action and generates a first projection coordinate X in the second sensing resolution corresponding to the image projection module 1 (for example: a pixel in a resolution 1280×720 of a projector) based on a sensing coordinate transfer. Thereafter, step 303 (please also refer to FIG. 5): the sensing module 2 senses a sensing coordinate of another pixel in the first sensing resolution triggered by the user at a second time point of a sensing action and generate a second projection coordinate Y in the second sensing resolution corresponding to the image projection module 1 based on a sensing coordinate transfer. The sensing action from the first time point to the second time point may be a continuous sensing action or an intermittent sensing action. Thereafter, step 304: the processing unit 4 determines whether the sensing module 2 senses a third projection coordinate on the target picture or the target image at a third time point of a sensing action. If the third projection coordinate is sensed, it is possible that the user did not complete a correct frame selection in the previous step; therefore, the image projection module 1 may issue an error message and the process returns to step 302 to re-sense the user's action.

Figure 6:
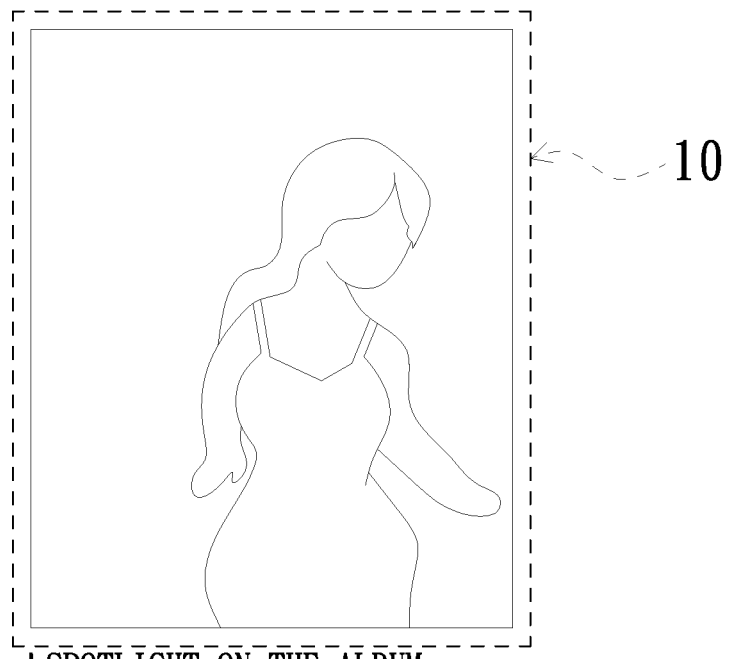
FIG. 6 is a schematic diagram of an operation of the picture selection method of projection touch of FIG. 3 for illustrating that the user performs a selection according to the first and second projection coordinates.

Alternatively, if the third projection coordinate is not sensed, step 305 (please also refer to FIG. 6): the processing unit 4 performs a selection on the target picture or the target image based on the coverage range of the first projection coordinate X and the second projection coordinate Y and generates a set of selected image data 10.

Figure 3A:
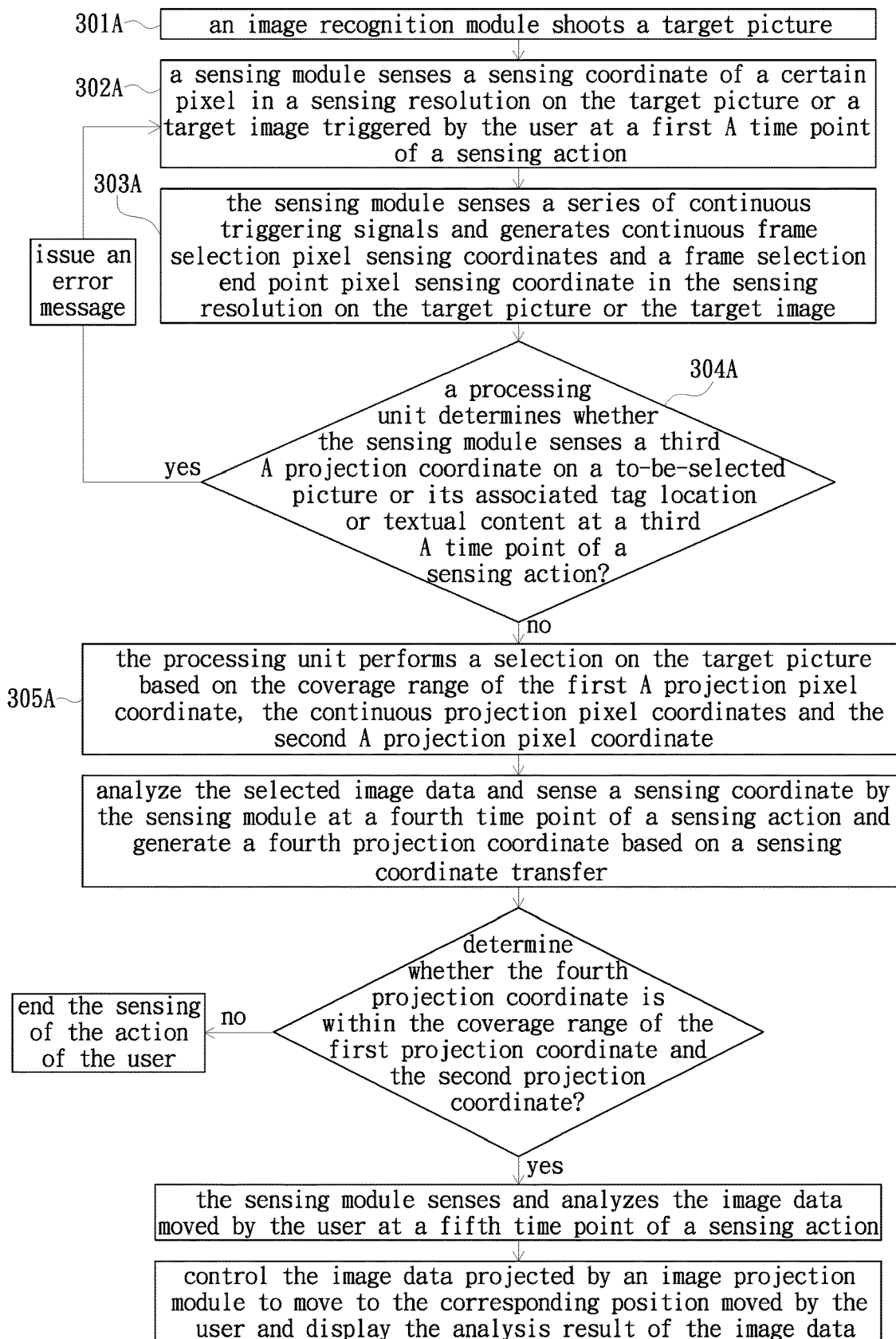
Figure 4A:
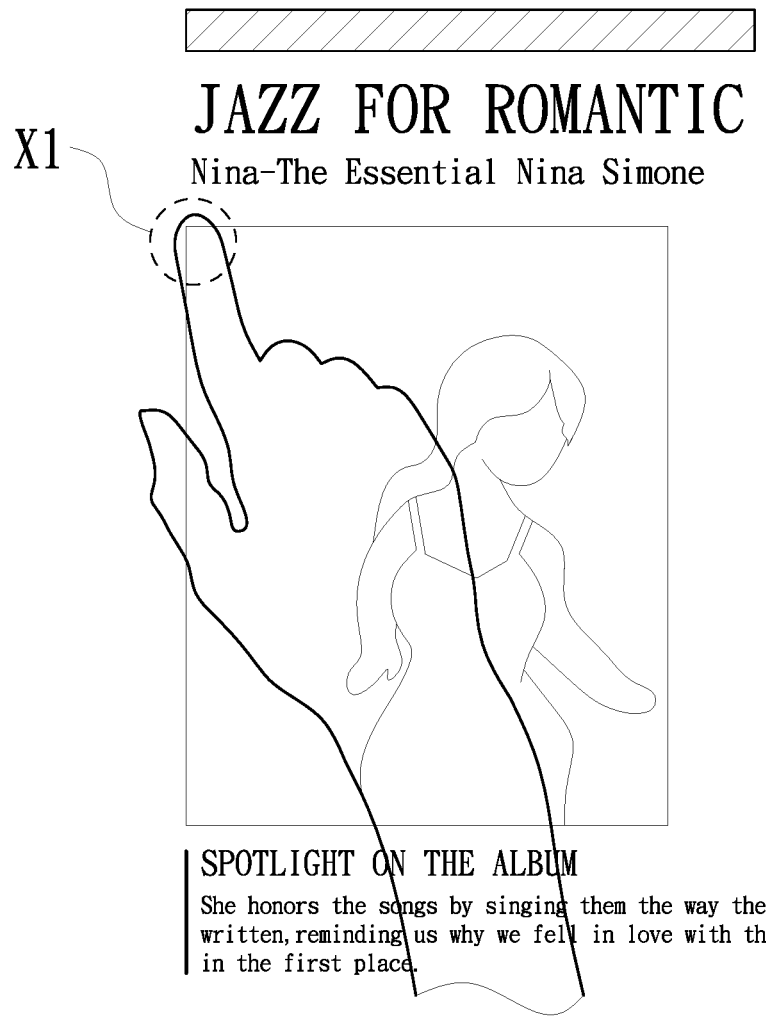
FIG. 4A is a schematic diagram of an operation of the picture selection method of projection touch of FIG. 3A.

FIG. 3A is a flowchart of a picture selection method in accordance with another embodiment of the present invention. Specifically, the picture selection method of the present embodiment is applicable to the projection touch system of FIG. 2 and uses continuous frame selection technique to select the to-be-selected picture or its associated tag or textual content in the target picture, wherein the selection of the to-be-selected picture may be obtained by selecting its associated tag. First, step 301A: the image recognition module 3 shoots the target picture to generate a corresponding target image and its background image data. Then, the processing unit 4 may cut off the background image data outside the target image to form target image data. Thereafter, step 302A (please also refer to FIG. 4A): the sensing module 2 senses a sensing coordinate of a pixel in the first sensing resolution triggered by the user at a first A time point of a sensing action and generates a corresponding first A projection pixel coordinate X1 in the second sensing resolution of the image projection module 1 based on a sensing coordinate transfer. Thereafter, step 303A (please also refer to FIG. 5): the user selects the to-be-selected picture or its associated tag or textual content in the target picture or the target image in a manner of frame selection, and correspondingly, the sensing module 2 senses a series of continuous triggering actions, generates continuous frame selection pixel sensing coordinates and a frame selection end point pixel sensing coordinate in the first sensing resolution on the target picture or the target image, and generates corresponding continuous projection pixel coordinate and a second A frame selection end point pixel sensing coordinate Y1 in the second sensing resolution of the image projection module 1 according to the continuous frame selection pixel sensing coordinates and the frame selection end point pixel sensing coordinate based on a sensing coordinate transfer. The to-be-selected picture or its associated tag or textual content is included in an area formed by the first A projection pixel coordinate X1, the continuous projection pixel coordinates and the second A frame selection end point projection pixel coordinate Y1. Thereafter, step 304A: the processing unit 4 determines whether the sensing module 2 senses a third A projection coordinate on the to-be-selected picture or its associated tag or textual content at a third A time point of a sensing action. If the third A projection coordinate is sensed, it is possible that the user did not complete a correct frame selection in the previous step; therefore, the image projection module 1 may issue an error message and the process returns to step 302A to re-sense the user's action.

Alternatively, if the third A projection coordinate is not sensed, step 305A (please also refer to FIG. 6): the processing unit 4 performs a selection on the target picture or the target image based on the coverage range of the first A projection pixel coordinate X1, the continuous projection pixel coordinates and the second A frame selection end point projection pixel coordinate Y1 and generates a set of selected image data 10.

Figure 4B:
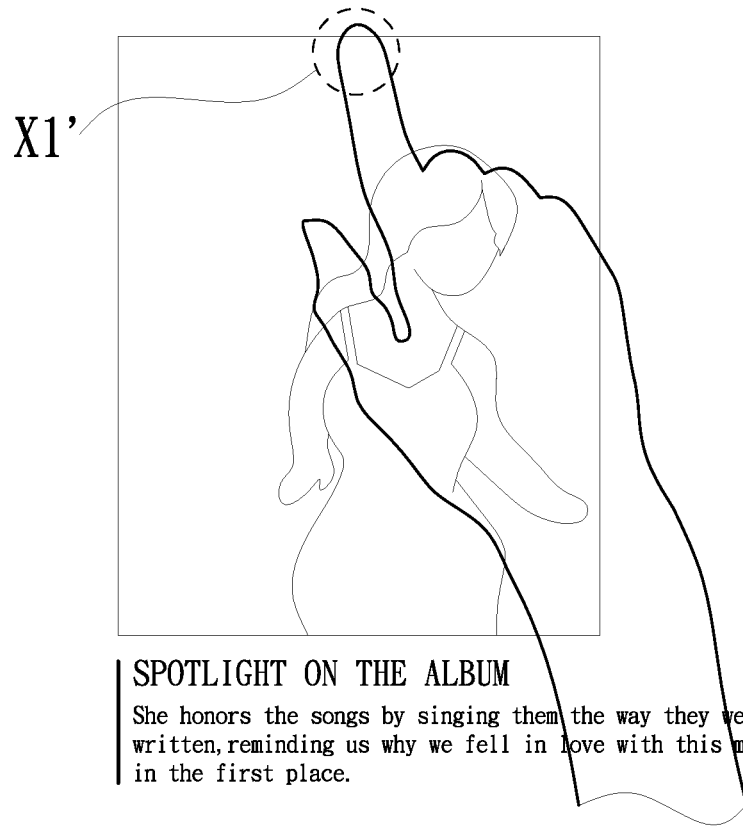
FIG. 4B is a schematic diagram of an operation of another picture selection method of projection touch of FIG. 3A.
Figure 5B:
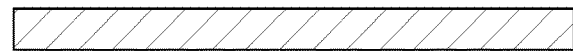
FIG. 5B is a schematic diagram of an operation of another picture selection method of projection touch of FIG. 3A.
Figure 5B:
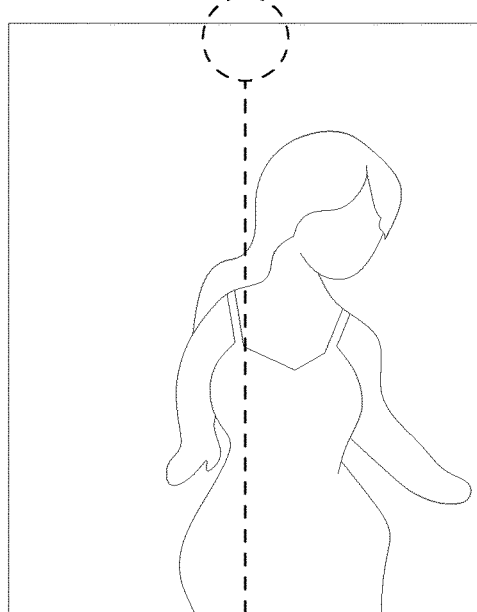
Figure 5B:
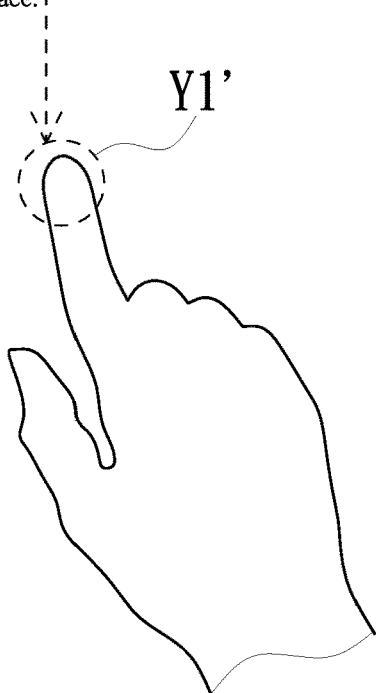

In the present embodiment, the method of selecting the to-be-selected picture or its associated tag or textual content may also be realized by a draw selection technique. For example, as shown in FIGS. 4B and 5B, the first A' projection pixel coordinate X1' in the second sensing resolution of the image projection module 1 and the continuous draw selection pixel sensing coordinates and the end point pixel sensing coordinate Y1' in the first sensing resolution on the target picture or the target image are formed by a continuous draw selection action across any pair of edges of the to-be-selected picture or its associated tag or textual content. At least a pair of edges of the to-be-selected picture or its associated tag or textual content is selected by a line formed by the first A projection pixel coordinate X1', the continuous projection pixel coordinates and the second A' draw selection end point projection pixel coordinate Y1' in a manner of draw selection. The remaining steps of selecting the to-be-selected picture or its associated tag or textual content are described in FIG. 3A and no redundant detail is to be given herein.

Figure 3B:
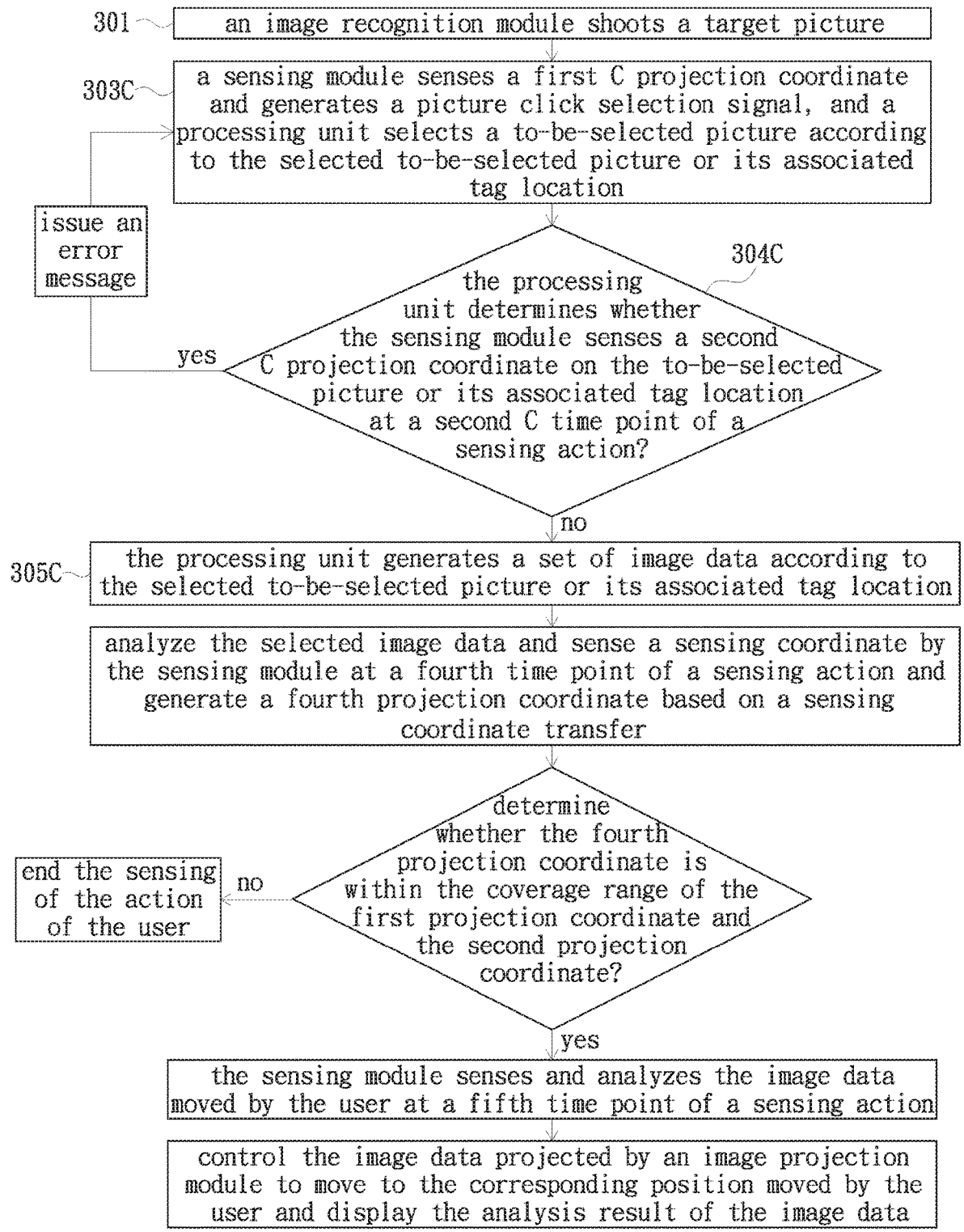
Figure 4C:
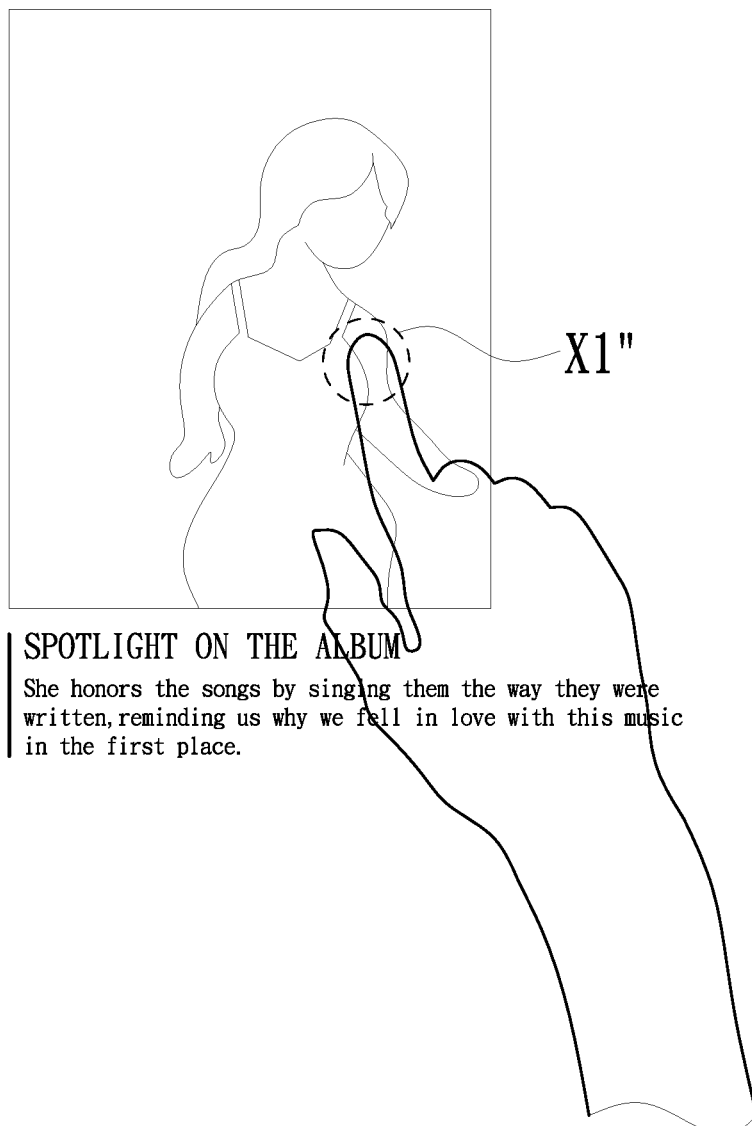
FIG. 4C is a schematic diagram of an operation of another picture selection method of projection touch of FIG. 3B.

FIG. 3B is a flowchart of a picture selection method in accordance with another embodiment of the present invention. Specifically, the picture selection method of the present embodiment is applicable to the projection touch system of FIG. 2 and uses click selection technique to select the to-be-selected picture or its associated tag in the target picture. Step 303C (please also refer to FIG. 4C): the user selects the to-be-selected picture or its associated tag in the target picture or the target image in a manner of click selection at a first C time point, and correspondingly, the sensing module 2 senses a first C projection coordinate X1" and generates a picture click selection signal. Then, the processing unit 4 selects the to-be-selected picture according to the selected to-be-selected picture or its associated tag. Thereafter, step 304C: the processing unit 4 determines whether the sensing module 2 senses a second C projection coordinate on the to-be-selected picture or its associated tag at a second C time point of a sensing action. If the second C projection coordinate is sensed, it is possible that the user did not complete a correct click selection in the previous step; therefore, the image projection module 1 may issue an error message and the process returns to step 303C to re-sense the user's action.

Alternatively, if the second C projection coordinate is not sensed, step 305C (please also refer to FIG. 6): the processing unit 4 generates a set of selected image data 10 according to the selected to-be-selected picture or its associated tag.

In the present embodiment, the action of click selection in step 303C may be a single click selection or a multiple quick click selection. The multiple click selection, such as a double click, is to repeat clicking on the target picture, the target image or the tag. However, it is understood that the number of times of click of a multiple click may be more than two. The first click action in a multiple click selection allows the sensing module 2 to sense a first C projection coordinate and generate a picture click selection signal. Since the repeated clicks are quick, the interval between the picture click selection signals is short and the logical misjudgment is avoided in the subsequent step 304C.

Figure 3C:
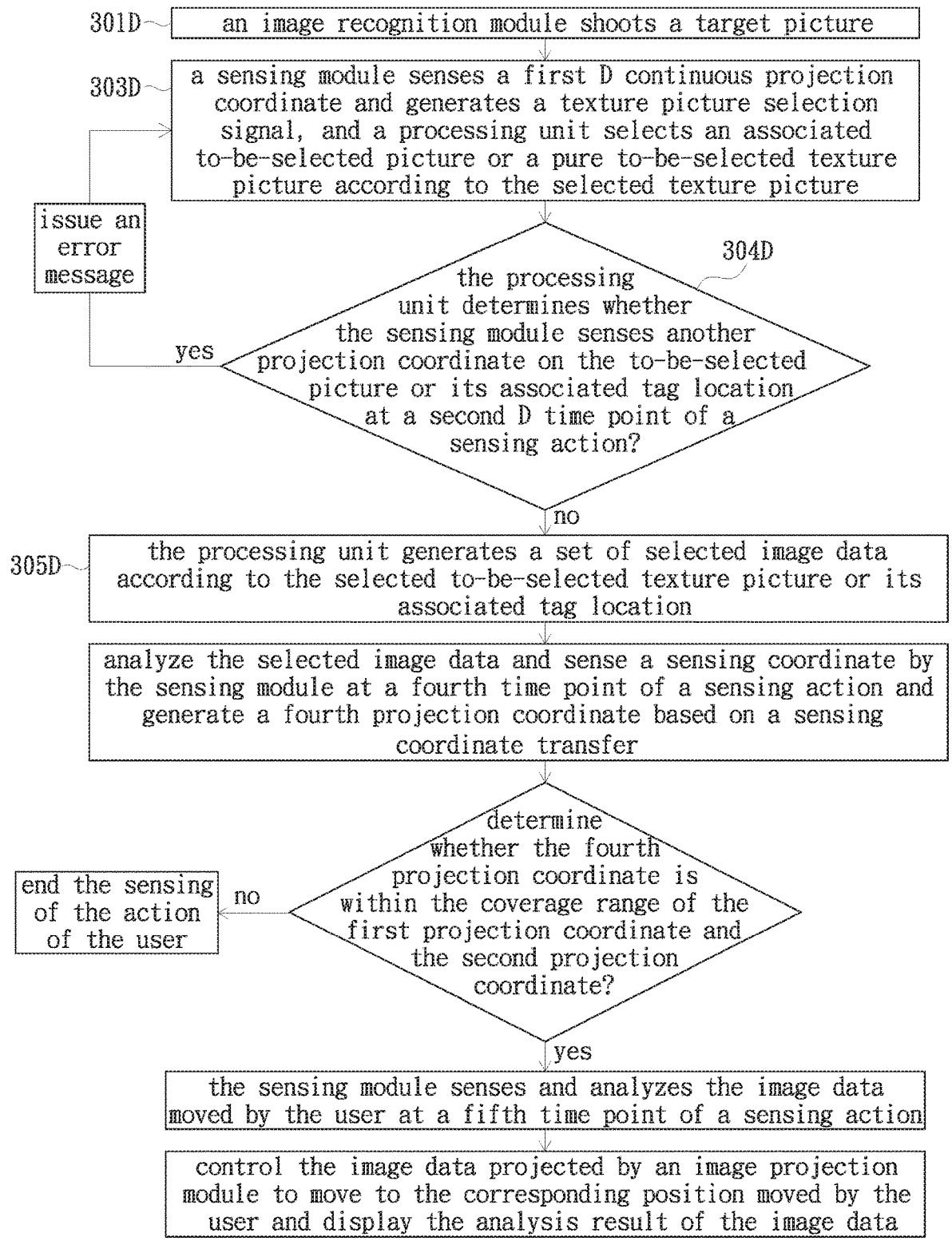
Figure 4D:
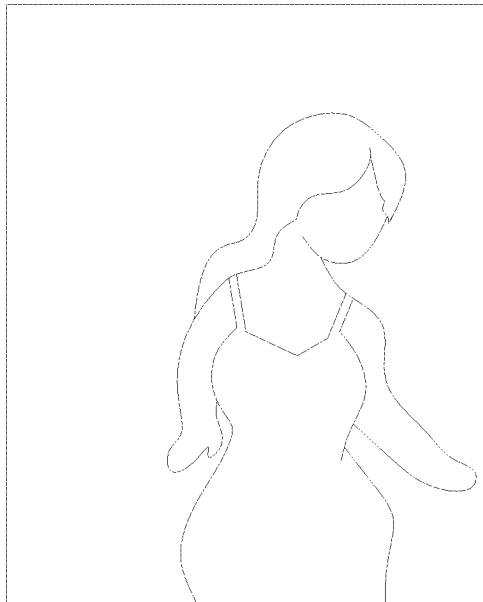
FIG. 4D is a schematic diagram of an operation of the picture selection method of projection touch of FIG. 3C.

FIG. 3C is a flowchart of a picture selection method in accordance with another embodiment of the present invention. Specifically, the picture selection method of the present embodiment is applicable to the projection touch system of FIG. 2 and uses the draw selection technique to select the to-be-selected text picture in the target picture. First, step 301D: the image recognition module 3 (e.g., camera) shoots the target picture to generate a corresponding target image and its background image data, wherein the target picture includes at least one pure to-be-selected text picture. Then, the processing unit 4 may cut off the background image data outside the target image to form target image data. Thereafter, step 303D (please also refer to FIG. 4D): the user selects the pure to-be-selected text picture in the target picture or the target image in a manner of draw selection (such as drawing a line under the pure to-be-selected text picture or drawing a line crossing the pure to-be-selected text picture) at a first D time point of a sensing action, and correspondingly, the sensing module 2 senses a first D continuous projection coordinate X1''' and generates a text picture selection signal. Then, the processing unit 4 selects the associated to-be-selected picture or the pure to-be-selected text picture according to the selected text picture. Thereafter, step 304D: the processing unit 4 determines whether the sensing module 2 senses another projection coordinate on the to-be-selected picture or the pure to-be-selected text picture at a second D time point of a sensing action. If the another projection coordinate is sensed, it is possible that the user did not complete a correct draw selection in the previous step; therefore, the image projection module 1 may issue an error message and the process returns to step 303D to re-sense the user's action.

Alternatively, if the other projection coordinate is not sensed, step 305D (please also refer to FIG. 6): the processing unit 4 generates a set of selected image data 10 according to the selected to-be-selected text picture or its associated tag.

Figure 3D:
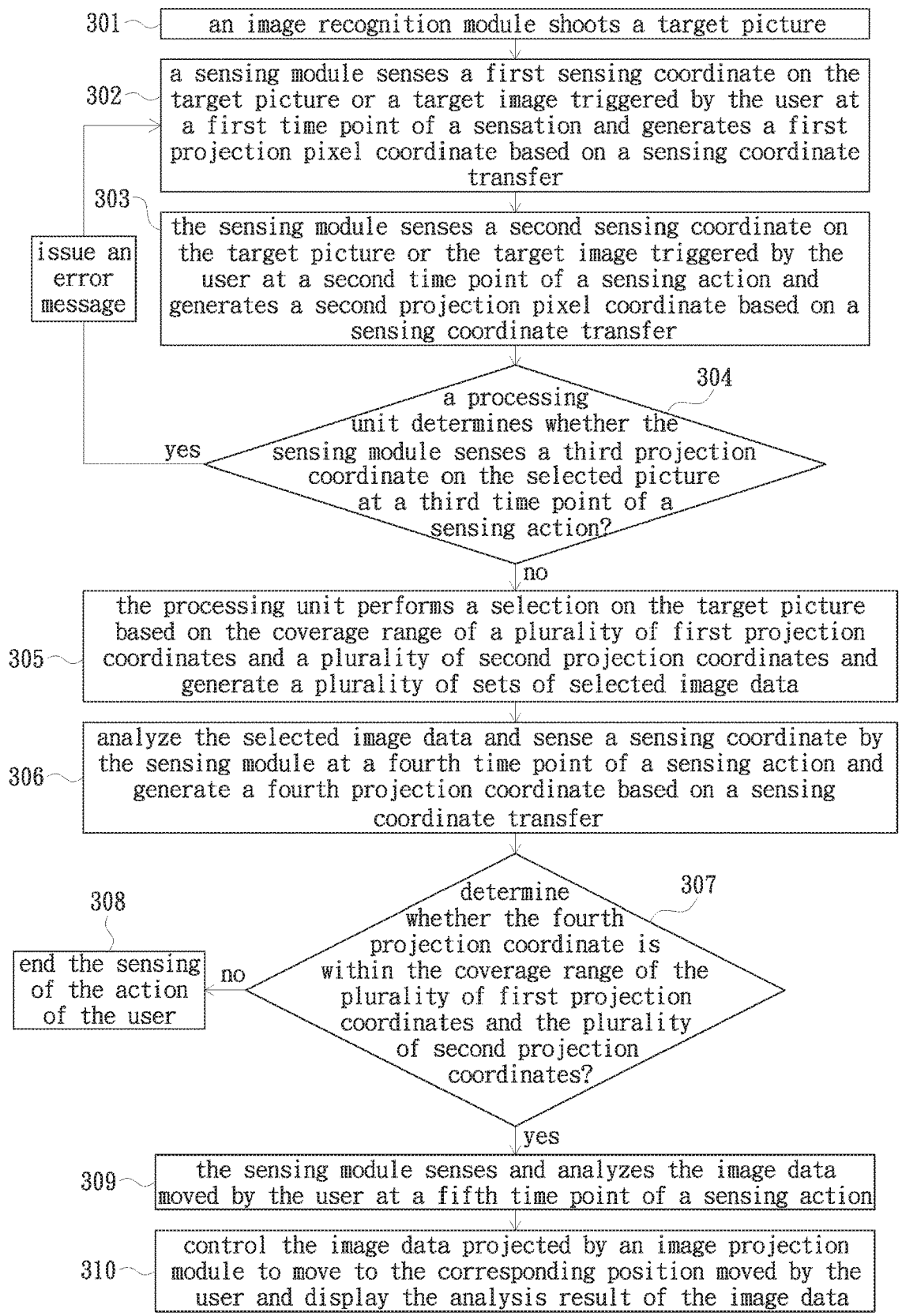

All of the above-described embodiments are based on selecting a single piece of picture data at a time. As for the method of simultaneously selecting a plurality piece of picture data within a single time, it is achieved by only modifying a portion of the process of the above embodiments. For example, the process "step 304: the processing unit 4 determines whether the sensing module 2 senses a third projection coordinate on the target picture or the target image at a third time point of a sensing action" in one above embodiment may be modified to "step 304: the processing unit 4 determines whether the sensing module 2 senses a third projection coordinate on the selected picture at a third time point of a sensing action", as shown in FIG. 3D. If the third projection coordinate is sensed, it is possible that the user did not complete a correct selection in the previous step; therefore, the image projection module 1 may issue an error message and the process returns to step 302 to re-sense the user's action. That is, if a third projection coordinate is sensed on the target picture or the target image outside the selected picture at a third time point of a sensing action, the user is prompted to select another to-be-selected picture in the target picture or the target image. Alternatively, if the third projection coordinate is not sensed, step 305 (please also refer to FIG. 6): the processing unit 4 performs a selection on the target picture or the target image based on the coverage range of a plurality of first projection coordinates X and a plurality of second projection coordinates Y and generates a set of selected image data 10.

Figure 3E:
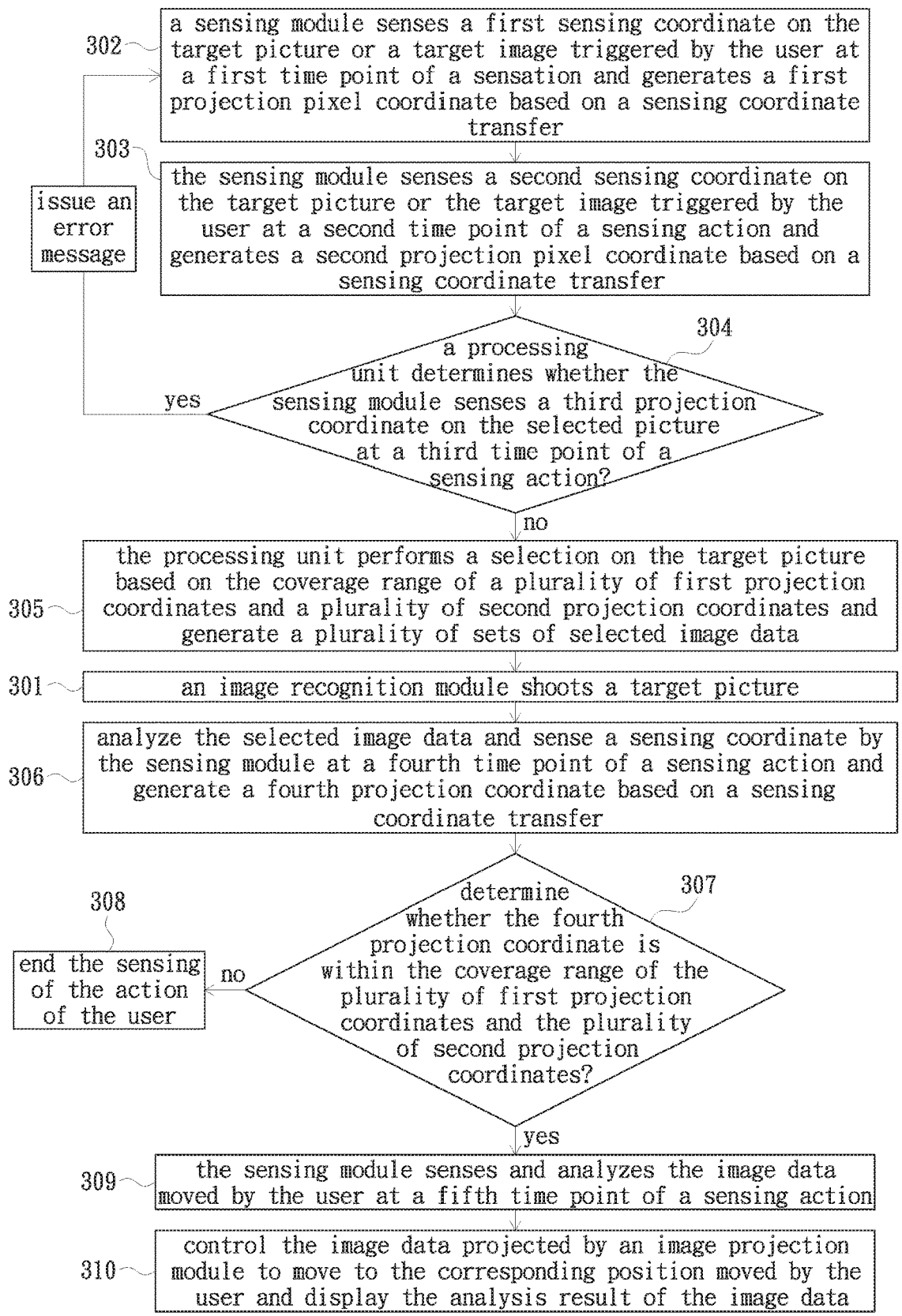

For the persons in the art, it is understood that the flow in all of the above embodiments may be adjusted. For example, the process of FIG. 3 may be adjusted as shown in FIG. 3E. Specifically, the step 301 may be adjusted to after the step 305, that is, the process of FIG. 3E starts from step 302 and the process "step 301: the image recognition module 3 shoots the target picture to generate a corresponding target image and its background image data. Then, the processing unit 4 may cut off the background image data outside the target image to form target image data" is performed after step 305. The remaining selection steps are described above and no redundant detail is to be given herein.

Figure 7:
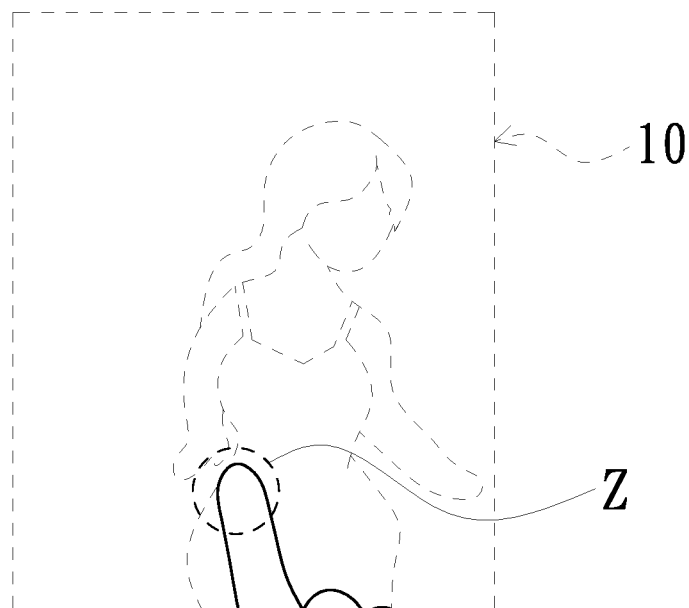
FIG. 7 is a schematic diagram of an operation of the picture selection method of projection touch of FIG. 3 for illustrating that the user triggers the third projection coordinate.
Figure 7A:
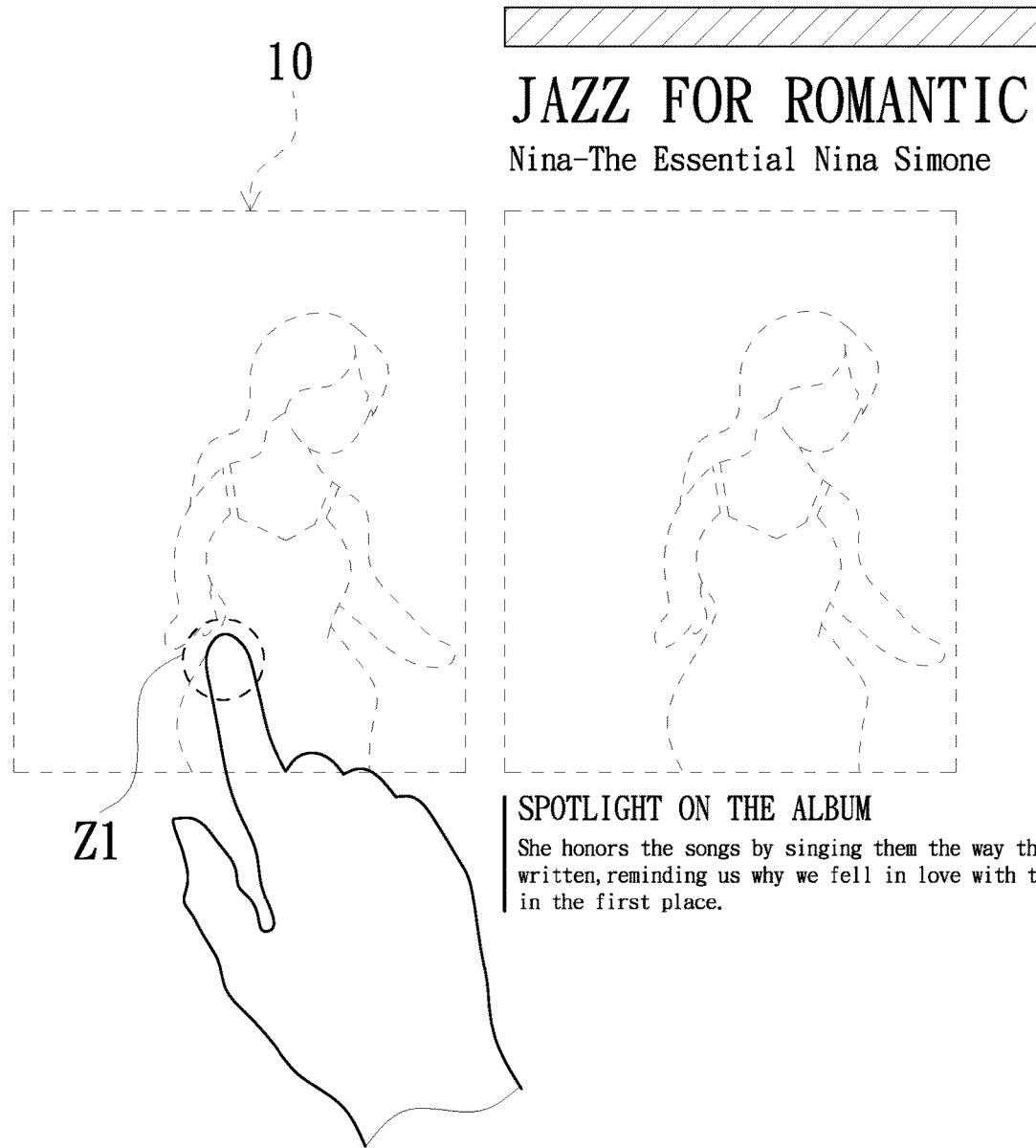
FIG. 7A is another schematic diagram of an operation of a picture selection method of projection touch.
Figure 8:
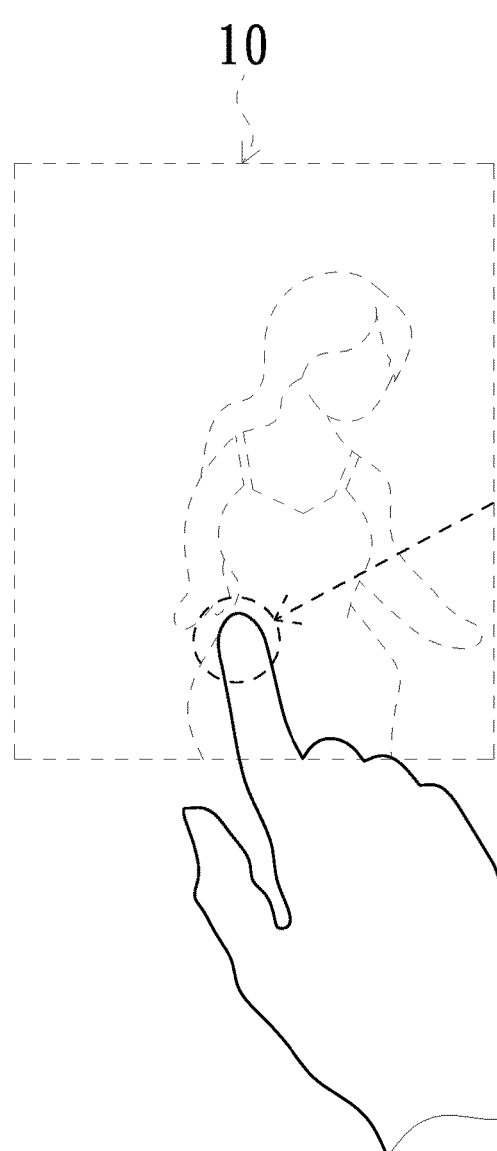
FIG. 8 is a schematic diagram of an operation of the picture selection method of projection touch of FIG. 7 for illustrating that the user drags the selected image data.
Figure 8:
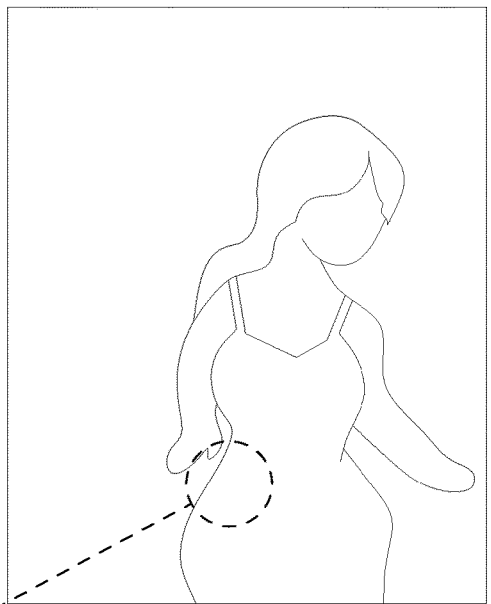

When the selected image data 10 is generated in all of the above embodiments, thereafter, step 306 (please also refer to FIG. 7): the image recognition module 3 and the processing unit 4 perform identification and analysis on the selected image data 10, and the sensing module 2 senses a sensing coordinate of another pixel in the first sensing resolution triggered by the user at a fourth time point of a sensing action and generate a fourth projection coordinate Z in the second sensing resolution corresponding to the image projection module 1 based on a sensing coordinate transfer. Thereafter, step 307: the processing unit 4 determines whether the fourth projection coordinate Z is within the range of the selected image data 10. Thereafter, step 308: the sensing of the action of the user is ended if the determination in step 307 is NO. Alternatively, step 309: the sensing module 2 senses and analyzes the image data 10 moved by the user at a fifth time point of a sensing action if the determination in step 307 is YES. Thereafter, step 310 (please also refer to FIG. 8): the processing unit 4 controls the image data 10 to move to the corresponding position moved by the user based on the analysis of the movement and displays the analysis result of the image data 10. In this example, the picture and the image are overlapped with each other. However, the image can be moved directly and independently based on the position of the fourth projection coordinate Z1, as shown in FIG. 7A.

Figure 8A:
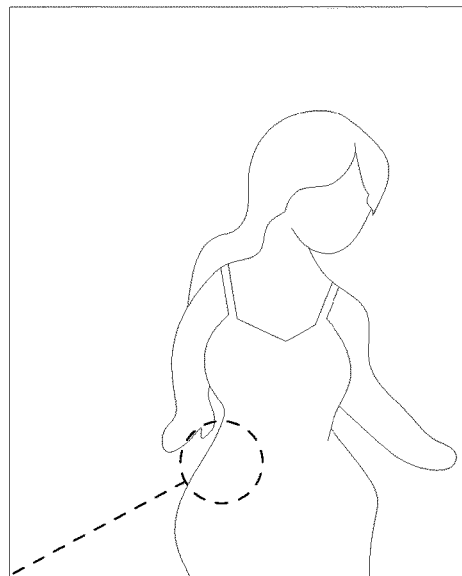
FIG. 8A is another schematic diagram of an operation of the picture selection method of projection touch.
Figure 8A:
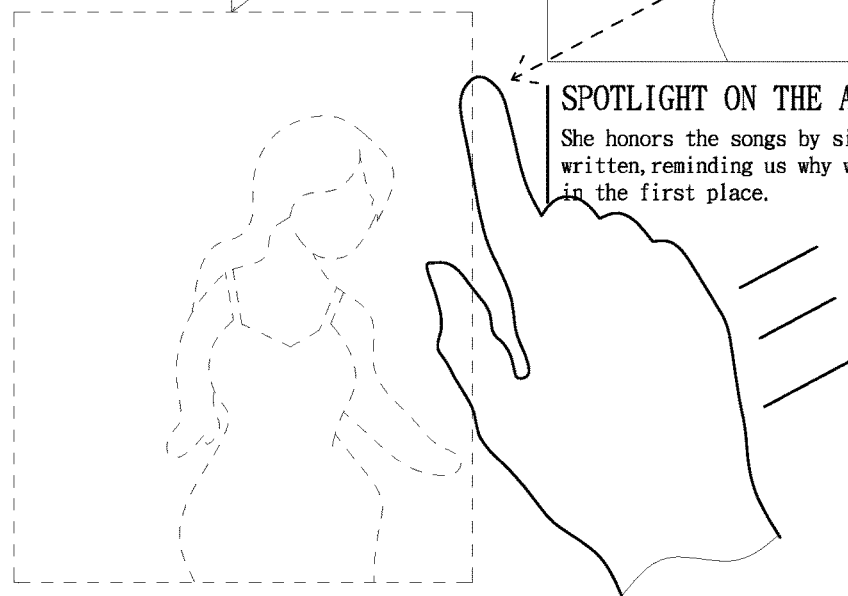

The method of moving the image data 10 of the present invention includes image dragging and image throwing or other movement methods. Image dragging is to drag an image from an original position to a new position. Image throwing is to throw an image from an original position to a new position in a direction of an axis; wherein the new position is located at any possible position of the axis, and the new position is determined by the speed and/or the force of the throwing, as shown in FIG. 8A. The dragging or throwing can be implemented via gestures, indicators, s touchpad or a mouse.

In addition, the sensing module 2 of the present invention may be an optical, acoustic or sensing action module. An optical sensing module can be composed of invisible light transmitting and receiving elements, such as infrared or far infrared ray transmitting and receiving elements. An acoustic sensing module can be composed of ultrasonic transmitting and receiving elements. A sensing action module can be composed of a resistive, capacitive or optical touchpad. When the sensing module 2 is an optical sensing module, the sensing of the action of the user may be realized by configuring the optical sensing module 2 to emit a laser light and receive the light spot of the user reflecting the laser light, thereby sensing the coordinate of the user's trigger according to the position of the light spot. For persons in the art, it is understood that the image recognition module 3 may be configured to receive the reflected light spot to sense the coordinate of the user's trigger. When the sensing module 2 is an acoustic sensing module, the sensing of the action of the user may be realized by configuring the acoustic sensing module 2 to emit an ultrasonic wave and receive the ultrasonic wave reflected by the user, thereby sensing the coordinate of the user's trigger according to the position and action of the reflected ultrasonic wave. When the sensing module 2 is a sensing action module, the sensing of the action of the user may be realized by configuring the sensing action module 2 to directly sense the position touched by the user, thereby sensing the coordinate of the user's trigger according to the position touched by the user.

Figure 9:
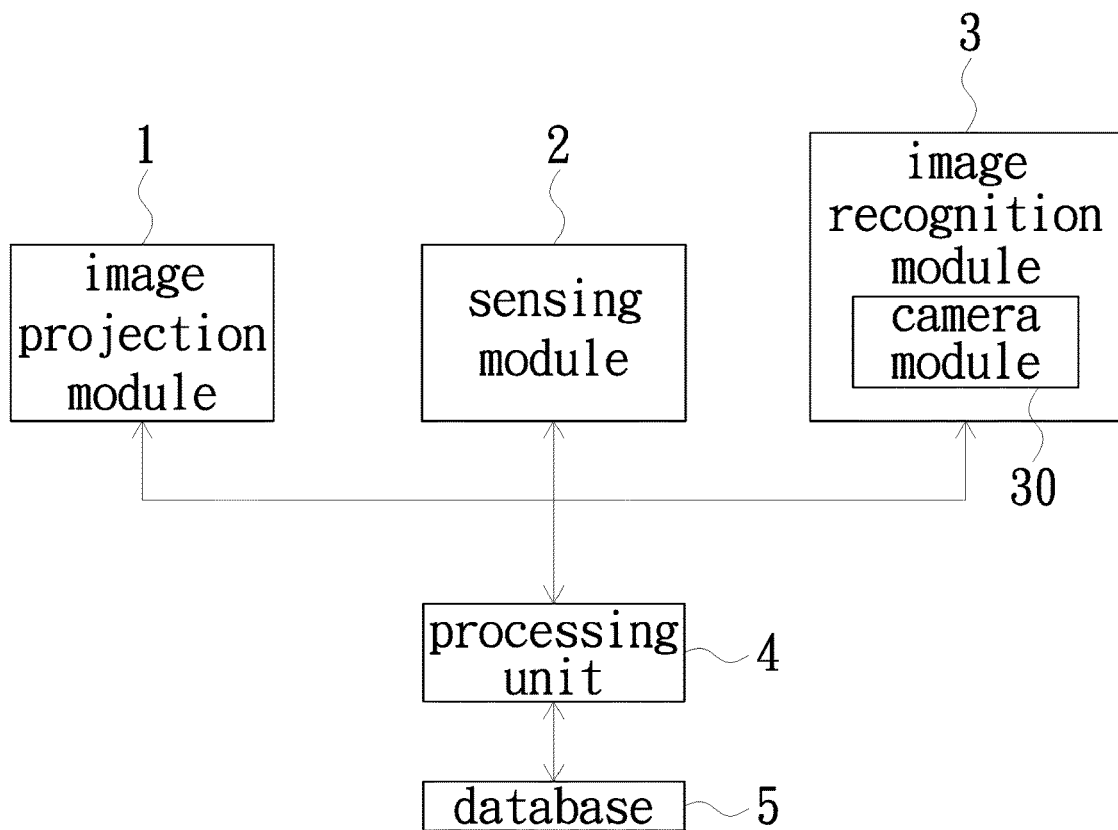
FIG. 9 is a block diagram of a projection touch system for a picture selection method of projection touch in accordance with another embodiment of the present invention.
Figure 10:
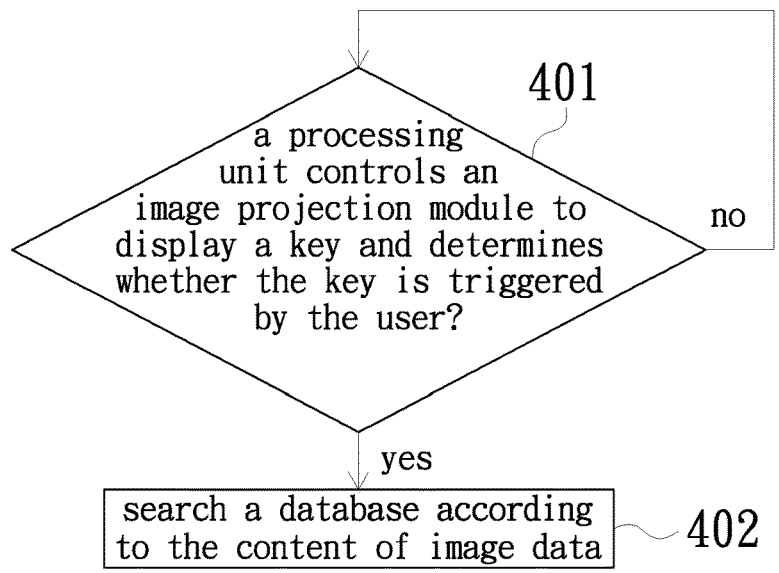
FIG. 10 is a flow chart of the picture selection method of projection touch of FIG. 9.
Figure 11:
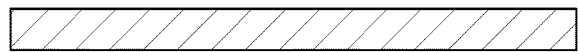
FIG. 11 is a schematic diagram of an operation of the picture selection method of projection touch of FIG. 9 for illustrating that the user triggers a key.
Figure 11:
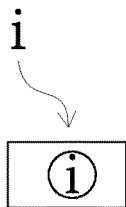
Figure 11:
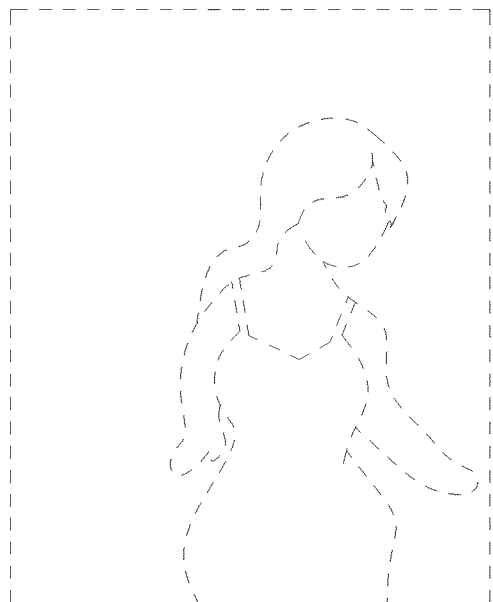
Figure 11:
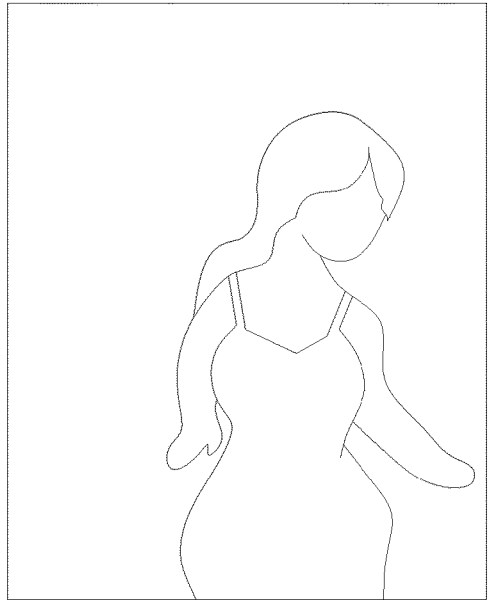
Figure 12:
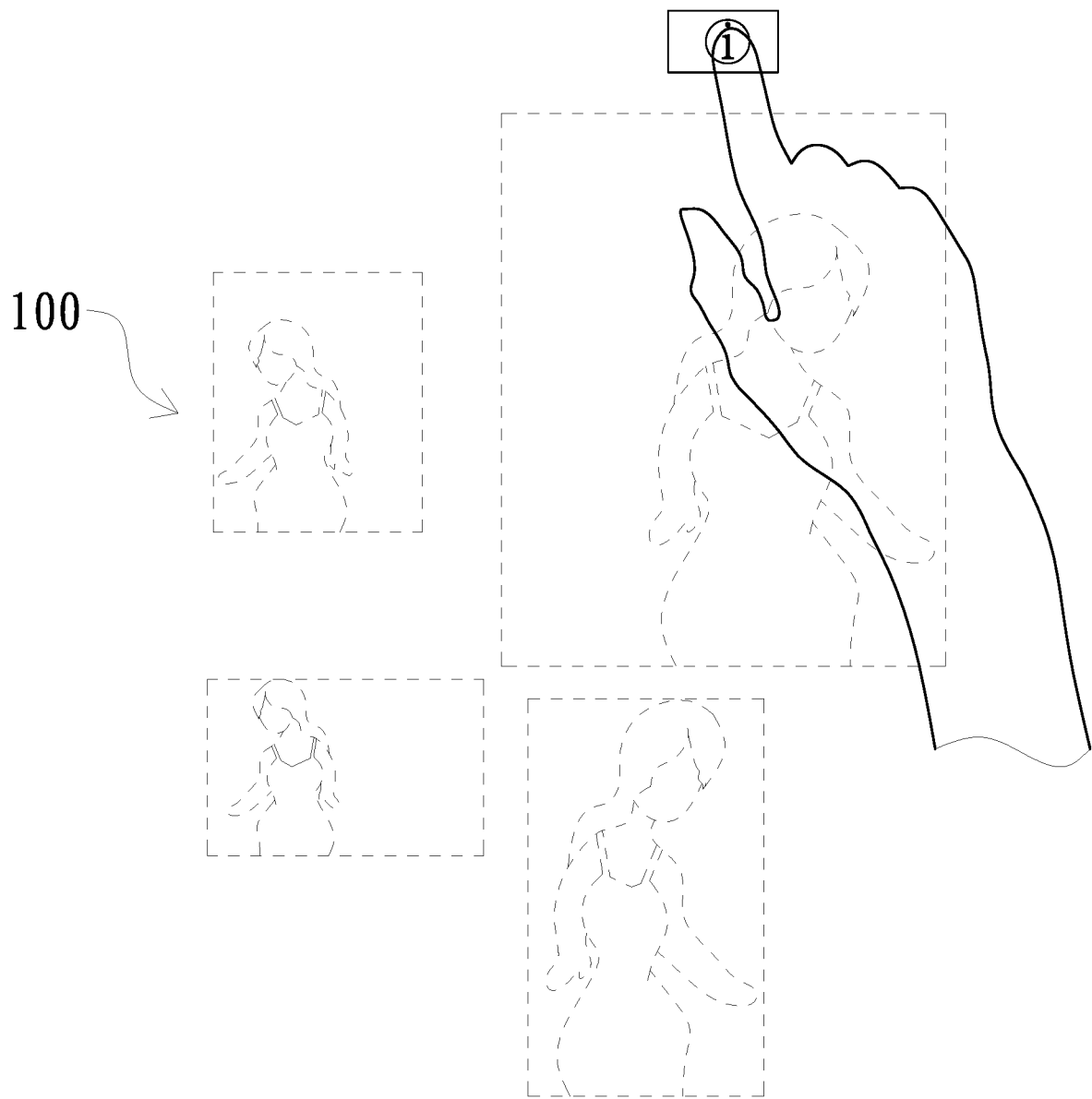
FIG. 12 is a schematic diagram of an operation of the picture selection method of projection touch of FIG. 9 for illustrating that a search is performed based on the image data.

FIG. 9 is a block diagram of a projection touch system corresponding to a picture selection method in accordance with another embodiment of the present invention. Compared with the projection touch system of FIG. 1, the projection touch system of FIG. 9 further includes a database 5 signally connected to the processing unit 4. FIG. 10 is a flowchart of a picture selection method in accordance with another embodiment of the present invention. Specifically, the picture selection method of the present embodiment is applicable to the projection touch system of FIG. 9. First, step 401 (followed by the step 310 in the above embodiments, and please also refer to FIG. 11): the processing unit 4 controls the image projection module 1 to display a key i and determines whether the key i is triggered by the user. Thereafter, the process returns to step 401 to continue to sense the user's action if the determination in step 401 is NO. Alternatively, step 402: the processing unit 4 searches the database 5 according to the contents of the image data 10 if the determination in step 307 is YES. Since the image data 10 in the present embodiment is exemplified by picture data, as shown in FIG. 12, after the processing unit 4 searches the contents of the picture data through the database 5, the relevant information 100 (e.g., the translation in Chinese) of a series of related pictures corresponding to the picture data is obtained and the image projection module 3 is controlled to display the retrieved pictures. The processing unit 4 controlling the image projection module 3 to activate the displaying of related information function of the image data may be implemented by sound prompt or gesture, in addition to the control of virtual key. For example, when the user activates the displaying of related information function of the image data by sound controlling the image projection module 3, the processing unit issues a voice prompt via the speaker and determines whether the function is triggered by the user's voice. Or, for example, when the user activates the displaying of related information function of the image data by gesture controlling the image projection module 3, the processing unit 4 analyzes the gesture of the user and determines whether the function is triggered by the user's gesture.

Figure 13:
FIG. 13 is a schematic diagram of an operation of the picture selection method of projection touch of FIG. 9 for illustrating that a search is performed based on the text of the image data.
Figure 13:
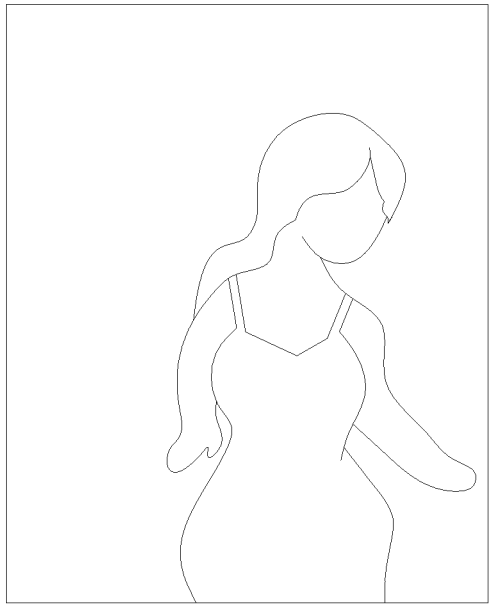
Figure 13:
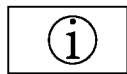

If the image data 10 selected by the user is text data, as shown in FIG. 13, the translated content of the corresponding text data or the related information 100 derived from the text data may be obtained first, and then the image projection module 3 may be controlled to display the translated content or display both the translated content and its derivative content or display the derivative content independently.

For persons in the art, it is understood that the steps 401 to 402 may be omitted in the above embodiments. That is, when the processing unit 4 performs a selection on the target picture or the target image and generates a set of image data 10, the process may directly enter the search process as in step 403.

For persons in the art, it is understood that the steps 306 to 310 may be omitted in the previous embodiment. That is, there is no need to determine whether the user moves the image data 10. When the processing unit 4 performs a selection on the target picture or the target image and generates a set of image data 10, the key i can be directly displayed for the user to directly enter the search flow as in steps 401 to 403.

Figure 14:
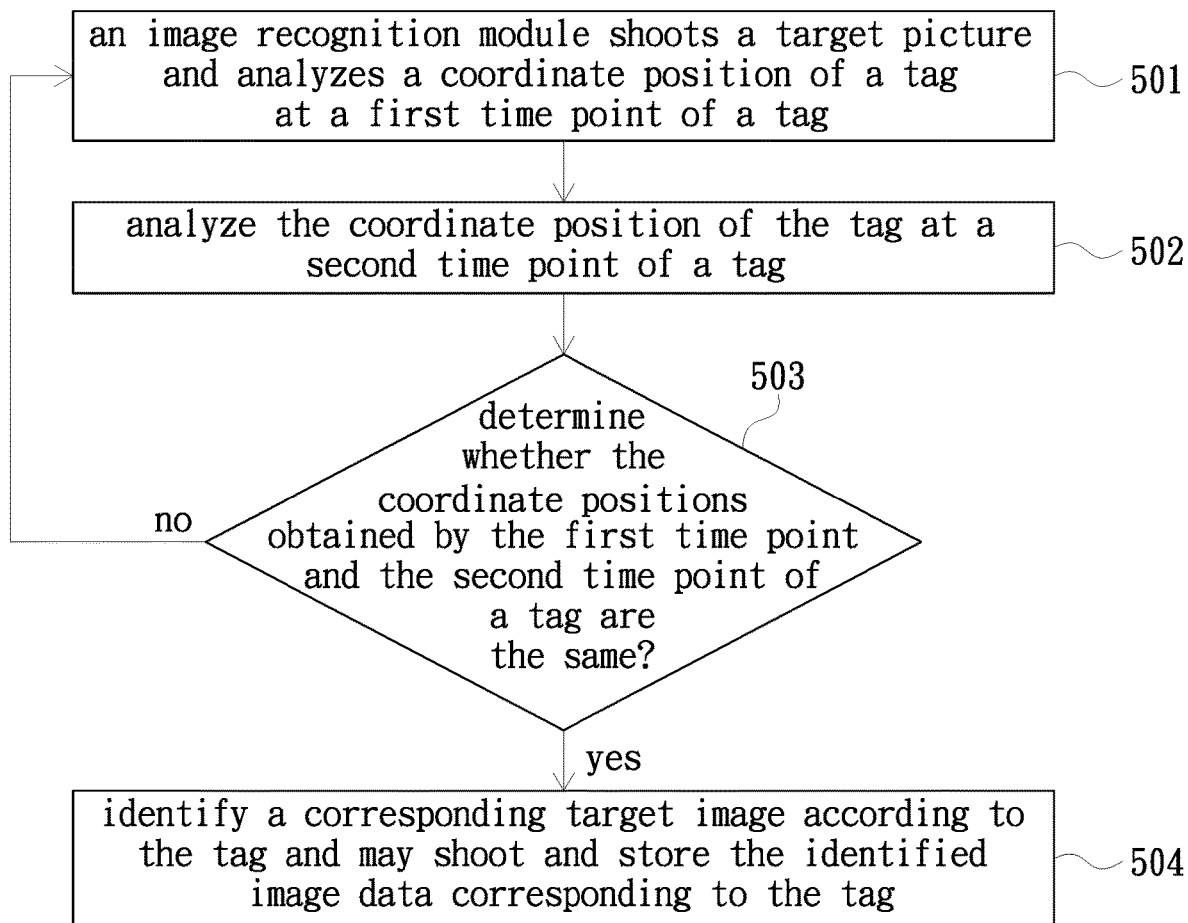
FIG. 14 is a schematic diagram of a picture selection method of projection touch of a projection touch system in accordance with another embodiment of the present invention.
Figure 15:
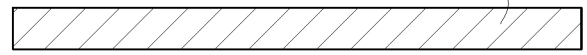
FIG. 15 is a schematic diagram of an operation of the picture selection method of projection touch of FIG. 14 for illustrating that the target image is identified based on the tag.
Figure 15:
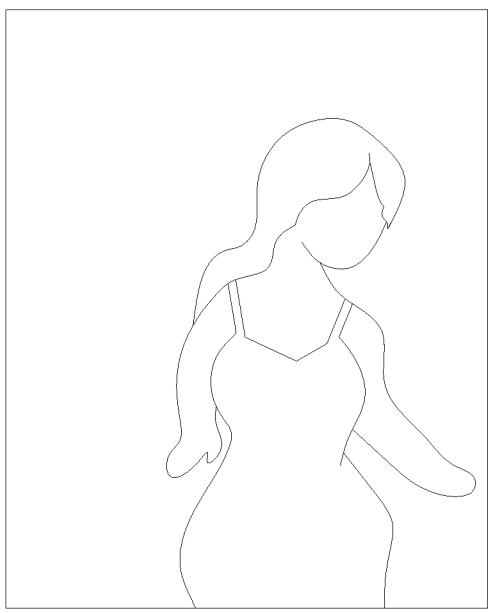

Another embodiment of the present invention provides a picture selection method, which is applicable to the projection touch system of FIG. 2. The target picture of the present embodiment has a tag. Before the process of the user performing a selection on the target picture or the target image, the picture selection method of the present embodiment further includes a process of detection and identification of tag to confirm whether the target picture or the target image has been maintained at a fixed position. FIG. 14 is a flowchart of a detection and identification of tag in accordance with an embodiment of the present invention. First, step 501 (please also refer to FIG. 15): the image recognition module 3 shoots the target picture, detects the tag 101, and analyzes the coordinate position of the tag 101 at a first time point of a tag. Thereafter, step 502: the image recognition module 3 analyzes the coordinate position of the tag 101 at a second time point of a tag. Thereafter, step 503: the processing unit 4 determines whether the coordinate positions obtained by the first time point and the second time point of a tag are the same. The process returns to step 501 to continue to detect if the determination in step 503 is NO, which indicates that the target picture has not been maintained at a fixed position. Alternatively, step 504: the processing unit 4 identifies the corresponding target picture according to the tag 101 and may shoot and store the identified picture data corresponding to the tag 101 if the determination in step 503 is YES which indicates that the target picture has been maintained at a fixed position.

Another embodiment of the present invention provides a detection and identification of tag. First, step 501 (please also refer to FIG. 15): the image recognition module 3 (e.g., camera) shoots the target picture, detects the tag 101, and analyzes the coordinate position of the tag 101 at a first time point of a tag. Thereafter, step 504: the processing unit 4 identifies the corresponding target picture according to the tag 101 and shoots the target picture corresponding to the tag 101, and analyzes the coordinate position of the tag 101 at a second time point of a tag. Thereafter, step 503: the processing unit 4 determines whether the coordinate positions obtained by the first time point and the second time point of a tag are the same. The process returns to step 501 to continue to detect if the determination in step 503 is NO, which indicates that the target picture has not been maintained at a fixed position. Alternatively, if the determination in step 503 is YES, it indicates that the target picture has been maintained at a fixed position and the shoot and storage of the picture data corresponding to the tag 101 is completed.

In this embodiment, the tag 101 is a block having a specific color, so that the processing unit 4 performs the identification of the target picture according to the size, color, shape or extension direction of the block. For the persons in the art, it is understood that the tag 101 may be designed as a two-dimensional barcode, and the processing unit 4 may perform the identification of the target picture according to the two-dimensional barcode.

The present invention provides a picture selection method of projection touch, in which different coordinate positions are triggered by the user at different time points, the picture data is selected according to the coordinate positions, and the operation process may be simultaneously displayed on the projected image screen projected by the image projection module. Further, when the user selects the picture data, the selected picture data can be further analyzed or retrieved to obtain information related to the selected picture, such as related picture or the corresponding translation of the text content, and the obtained information is displayed through a projection screen simultaneously, thereby achieving the above purpose.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A picture selection method of projection touch for a user to select at least one to-be-selected picture in a target picture through a projection touch system, the projection touch system comprising an image projector, a sensor, an image recognizer comprising at least one camera module and a processor, the image projector, the sensor, the image recognizer and the processor being connected with each other, the image projector being for projecting an image data screen of the projection touch system, and the picture selection method comprising steps of:
   a) the sensor sensing and transferring a first projection coordinate on the target picture triggered by the user at a first time point of a sensing action;

b) the sensor sensing and transferring a second projection coordinate on the target picture triggered by the user at a second time point of the sensing action;

c) the processor selecting the at least one to-be-selected picture in the target picture based on a coverage range of the first projection coordinate and the second projection coordinate and generating a set of selected image data; and d) the processor controlling the selected image data projected by the image projector to move to a corresponding position designated by the user according to a movement instruction of the user;

wherein after the step c) the picture selection method further comprises steps of:

c11) the processor determining whether the sensor senses a third i projection coordinate on the target picture at a third i time point of the sensing action;

c12) if the third i projection coordinate is sensed on the selected picture, the image projector displaying an error message and re-sensing the sensing action of the user;

c13) if the third i projection coordinate is sensed outside the selected picture, prompting the user to select another to-be-selected picture in the target picture;

c14) the sensor sensing and transferring a fourth i projection coordinate on the target picture triggered by the user at a fourth i time point of the sensing action;

c15) the processor determining whether the at least one of the fourth i projection coordinate is within a coverage range of a coordinate of any of the selected pictures; and c16) if the at least one of the fourth i projection coordinate is within the coverage range, the sensor sensing and transferring the selected image data moved by the user at a fifth i time point of the sensing action;

wherein the movement of the selected image data comprises image dragging and image throwing.

2. The picture selection method of projection touch according to claim 1, wherein a tag of the to-be-selected picture is located within the first projection coordinate and the second projection coordinate on the target picture sensed and transferred by the sensor and triggered by the user at the first time point and the second time point of the sensing action, respectively.

3. The picture selection method of projection touch according to claim 2, wherein before the step a) the picture selection method further comprises steps of:

a1') the image recognizer analyzing a coordinate position of the tag at a first time point of a tagging;

a2') the image recognizer analyzing a coordinate position of the tag at a second time point of the tagging;

a3') the processor determining whether the coordinate positions obtained at the first time point and the second time point of the tagging are identical, and if yes, detecting and recognizing the tag; and a4') the processor identifying the at least one to-be-selected picture according to at least one of the tag, shooting and storing picture data corresponding to the identified tag, and generating target image data and background image data of the target image data.

4. The picture selection method of projection touch according to claim 2, wherein before the step a) the picture selection method further comprises steps of:

a4") the processor determining whether the coordinate positions obtained at the first time point and the second time point of the tagging are identical, and if yes, completing the shooting and storing of the picture data corresponding to the tag.

5. The picture selection method of projection touch according to claim 2, wherein the tag is a block having a specific color, and the processor performs identification of the target picture based on a size, a color, a shape and an extension direction of the block.

6. The picture selection method of projection touch according to claim 2, wherein the tag is a two-dimensional barcode, and the processor performs identification of the target picture based on the two-dimensional barcode.

7. The picture selection method of projection touch according to claim 1, wherein the image recognizer shoots the target picture and generates a corresponding target image and background image data of the target image before the user selects the at least one to-be-selected picture in the target picture.

8. The picture selection method of projection touch according to claim 7, wherein the processor cuts off the background image data outside the target image before the target image is projected onto the target picture.

9. The picture selection method of projection touch according to claim 8, wherein the image projector projects the target image onto the target picture to overlay the target picture before the user selects the at least one to-be-selected picture in the target picture.

10. The picture selection method of projection touch according to claim 3, wherein the processor cuts off the background image data outside the target image before the target image is projected onto the target picture.

11. The picture selection method of projection touch according to claim 7, wherein the image projector projects the target image onto the target picture to overlay the target picture before the user selects the at least one to-be-selected picture in the target picture.

12. The picture selection method of projection touch according to claim 1, wherein the processor further analyzes the selected image data and controls the image projector to display an analysis result of the selected image data.

13. The picture selection method of projection touch according to claim 1, wherein after the step c) the picture selection method further comprises steps of:

c1) the processor determining whether the sensor senses a third projection coordinate on the target picture at a third time point of the sensing action;

c2) if the third projection coordinate is not sensed, the sensor sensing and transferring a fourth projection coordinate on the target picture triggered by the user at a fourth time point of the sensing action;

c3) the processor determining whether the fourth projection coordinate is within the coverage range of the first projection coordinate and the second projection coordinate; and c4) if the fourth projection coordinate is within the coverage range, the sensor sensing and transferring the selected image data moved by the user at a fifth time point of the sensing action.

14. The picture selection method of projection touch according to claim 1, wherein the projection touch system further comprises a database connected with the processor, and step d) further comprises a step of:

d1) the processor searching the database based on a content of the selected image data and obtaining a set of related information corresponding to the selected image data.

15. The picture selection method of projection touch according to claim 14, wherein the step d1) further comprises steps of:
   d11) the processor controlling the image projector to activate a function of displaying related information of the selected image data and determining whether the function is triggered by the user; and
   d12) if the function is triggered, the processor controlling the image projector to display the related information of the selected image data.

16. The picture selection method of projection touch according to claim 2, wherein the tag of the to-be-selected picture is located within the first projection coordinate and the second projection coordinate on the target picture sensed and transferred by the sensor and triggered by the user at the first time point and the second time point of the sensing action, respectively.

17. The picture selection method of projection touch according to claim 1, wherein the sensing action is a continuous sensing action or an intermittent sensing action.

18. The picture selection method of projection touch according to claim 1, wherein the image dragging is to move an image from an original position to a new position by dragging.

19. The picture selection method of projection touch according to claim 1, wherein the image dragging and the image throwing are implemented by a gesture, an indicator, a touchpad or a mouse.

20. The picture selection method of projection touch according to claim 1, wherein the image throwing is to throw an image from an original position to a new position along a direction of an axis, the new position is located at any possible position along the axis, and the new position is determined by speed and/or force of the throwing.

21. The picture selection method of projection touch according to claim 2, wherein before the step a) the picture selection method further comprises steps of:
   a4") the processor determining whether the coordinate positions obtained at the first time point and the second time point of the tagging are identical, and if yes, completing the shooting and storing of the tag.

22. The picture selection method of projection touch according to claim 15, wherein a method of the image projector activating a function of displaying related information of the selected image data comprises a step of:
   d121) displaying a virtual key and determining whether the virtual key is triggered by the user;
   d122) issuing a voice prompt and determining whether the function is triggered by the user's voice; or
   d123) analyzing a gesture of the user and determining whether the function is triggered by the gesture of the user.

* * * * *